US010655706B2

(12) United States Patent
Tesar

(10) Patent No.: US 10,655,706 B2
(45) Date of Patent: *May 19, 2020

(54) MODIFIED PARALLEL ECCENTRIC ROTARY ACTUATOR

(71) Applicant: Delbert Tesar, Austin, TX (US)

(72) Inventor: Delbert Tesar, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/474,817

(22) Filed: Mar. 30, 2017

(65) Prior Publication Data
US 2017/0204939 A1    Jul. 20, 2017

Related U.S. Application Data

(63) Continuation of application No. 14/732,286, filed on Jun. 5, 2015, now Pat. No. 9,657,813.

(60) Provisional application No. 62/008,586, filed on Jun. 6, 2014.

(51) Int. Cl.
F16H 1/32 (2006.01)
H02K 7/116 (2006.01)
F16H 55/17 (2006.01)
F16H 57/08 (2006.01)

(52) U.S. Cl.
CPC ............ F16H 1/32 (2013.01); F16H 55/17 (2013.01); F16H 57/08 (2013.01); H02K 7/116 (2013.01); F16H 2001/323 (2013.01)

(58) Field of Classification Search
None
See application file for complete search history.

(56) References Cited

U.S. PATENT DOCUMENTS

| 1,767,866 | A | * | 6/1930 | Wildhaber | F16H 1/32 475/178 |
| 3,073,184 | A | * | 1/1963 | Brarern | F16H 1/32 475/180 |
| 3,192,799 | A | * | 7/1965 | Pamplin | F16H 1/32 475/168 |
| 3,602,615 | A | * | 8/1971 | Erwin | F16H 1/32 418/61.1 |
| 3,661,028 | A | * | 5/1972 | Fuchs | F16H 55/10 74/415 |

(Continued)

FOREIGN PATENT DOCUMENTS

JP          03172660 A  *  7/1991  ............ F16H 55/30

OTHER PUBLICATIONS

Dyson, et al. "Wildhaber-Novikov circular arc gears: geometry and kinematics", Proc. R. Soc. Lond. A 403, 313-340 (1986) (Year: 1986).*

(Continued)

Primary Examiner — Dirk Wright
(74) Attorney, Agent, or Firm — John A. Fortkort; Fortkort & Houston PC

(57) ABSTRACT

A rotary actuator is provided which includes an internal gear, first and second parallel eccentric gears which mesh with said internal gear, a crankshaft equipped with first and second eccentrics which are 180° out-of-phase and which drive said first and second parallel eccentric gears, respectively, a prime mover which drives said crankshaft, first and second crosslinks which prevent the rotation of said first and second parallel eccentric gears, respectively, and first and second sets of splines which engage said first and second parallel eccentric gears, respectively.

20 Claims, 28 Drawing Sheets

(56) References Cited

U.S. PATENT DOCUMENTS

| | | | | |
|---|---|---|---|---|
| 3,985,047 A * | 10/1976 | Therkelsen | ............. | B66D 1/14 254/354 |
| 4,031,781 A * | 6/1977 | Iida | ............. | F16H 1/32 475/180 |
| 4,117,746 A * | 10/1978 | Pierrat | ............. | F16H 1/32 475/168 |
| 4,471,672 A * | 9/1984 | Butterfield | ............. | F16H 25/06 188/82.84 |
| 4,567,790 A * | 2/1986 | Butterfield | ............. | F16H 25/06 475/168 |
| 4,697,477 A * | 10/1987 | Barr | ............. | F16D 57/002 475/154 |
| 5,433,672 A * | 7/1995 | Tanaka | ............. | F16H 1/32 475/178 |
| 5,509,861 A * | 4/1996 | Wacinski | ............. | F16H 1/32 475/162 |
| 5,908,372 A * | 6/1999 | Janek | ............. | F16H 1/32 477/162 |
| 5,954,609 A * | 9/1999 | Fecko | ............. | F16C 19/362 475/162 |
| 7,081,062 B2 * | 7/2006 | Tesar | ............. | F16H 1/28 475/163 |
| 7,431,676 B2 * | 10/2008 | Tesar | ............. | F16H 1/28 475/163 |
| 7,476,174 B2 * | 1/2009 | Fujimoto | ............. | F16H 1/32 475/162 |
| 8,033,942 B2 * | 10/2011 | Tesar | ............. | F16H 1/28 475/163 |
| 8,403,789 B2 * | 3/2013 | Janek | ............. | F16H 1/32 475/116 |
| 9,074,660 B2 * | 7/2015 | Janek | ............. | F16H 1/32 |
| 9,657,813 B2 * | 5/2017 | Tesar | ............. | F16H 1/32 |
| 9,862,263 B2 * | 1/2018 | Tesar | ............. | B60K 7/0007 |
| 9,879,760 B2 * | 1/2018 | Tesar | ............. | H02K 7/116 |
| 9,915,319 B2 * | 3/2018 | Tesar | ............. | H02K 7/116 |
| 2006/0199692 A1 * | 9/2006 | Janek | ............. | F16H 1/32 475/162 |
| 2007/0168081 A1 * | 7/2007 | Shin | ............. | B25J 9/08 700/245 |

OTHER PUBLICATIONS

Chen, et al. "Geometry and parameter design of novel circular arc helical gears for parallel-axis transmission", Advances in Mechanical Engineering, 2017, vol. 9(2) 1-11 (Year: 2017).*

Litvin et al. "Computerized Simulation of Generation, Meshing and Contact of Double Circular-Arc Helical Gears", Mathl. Comput. Modelling vol. 18, No. 5, pp. 31-47, 1993 (Year: 1993).*

Lu et al. "Load Share and Finite Element Stress Analysis for Double Circular-Arc Helical Gears", Mahl. Comput. Modelling vol. 21, No. 10, pp. 13-30, 1995. (Year: 1995).*

Litvin et al. "New Methods for Improved Double Circular-Arc Helical Gears" NASA contractor report 4771, 1997 (Year: 1997).*

* cited by examiner

MODIFIED PARALLEL ECCENTRIC ROTARY ACTUATOR

CROSS-REFERENCE TO RELATED APPLICATIONS

The present application is a continuation of U.S. Ser. No. 14/732,286, filed on Jun. 5, 2015, which has the same title and the same inventor, and which is incorporated herein by reference in its entirety; which claims priority to U.S. Provisional Application No. 62/008,586, filed on Jun. 6, 2014, which has the same title and the same inventor, and which is incorporated herein by reference in its entirety.

FIELD OF THE DISCLOSURE

The present disclosure relates generally to rotary actuators, and more specifically to a modified parallel eccentric rotary actuator equipped with unique surface features to provide rotation constraint.

BACKGROUND OF THE DISCLOSURE

Electromechanical actuators (EMAs) play a key role in the performance and cost effectiveness of intelligent electromechanical systems. This role is underscored by the growing market for EMAs. Indeed, significant parallels exist between the market development currently unfolding for EMAs and the market development of semiconductor chips seen in the electronics industry over the past several decades. At present, it is forecasted that EMAs will see a continued growth of 50% every three years, and that the market for EMAs will exceed the market for semiconductor chips in two decades.

SUMMARY OF THE DISCLOSURE

Figure 1:
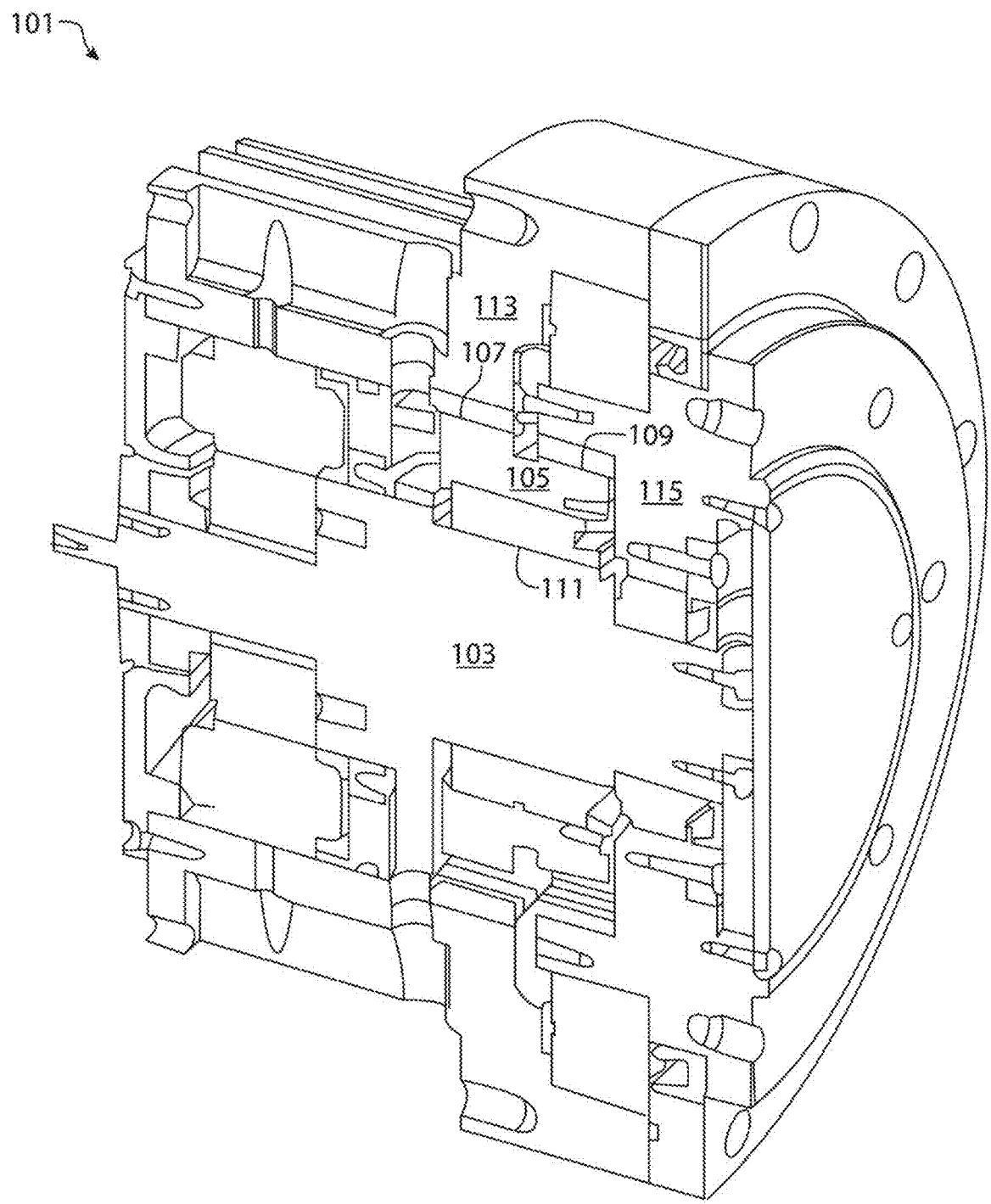
FIG. 1 is a cross-sectional illustration of a prior art rotary actuator with a hypocyclic gear train.

In one aspect, a rotary actuator is provided which comprises a crankshaft; a first eccentric gear disposed on a first end of said crankshaft; a second eccentric gear disposed on a second end of said crankshaft; first and second end plates; a first crosslink disposed between said first eccentric gear and said first end plate; and a second crosslink disposed between said second eccentric gear and said second end plate. The first crosslink has a first set of surface features on a surface thereof which engage a second set of surface features on the first eccentric gear, and at least one of the first and second eccentric gears is equipped with circular arc gear teeth.

In another aspect, a rotary actuator is provided which comprises a crankshaft; a first eccentric gear which is disposed on a first end of said crankshaft and which is equipped with circular arc gear teeth; a first end plate; and a first crosslink which is disposed between said first eccentric gear and said first end plate, and which has a first set of surface features on a surface thereof which engage a second set of surface features on said first eccentric gear.

In a further aspect, a rotary actuator is provided which comprises a gear train which includes (a) a single output internal gear, (b) a plurality of rolling element bearings, and (c) a pair of oscillating, parallel external gears which are equipped with circular arc gear teeth, which mesh with said internal gear, and which are supported by said plurality of roller element bearings; a pair of eccentrics which drive said pair of external gears; and a central crankshaft which drives said pair of eccentrics.

DETAILED DESCRIPTION

I. Actuator Gear Train Development

A. Objective

It is a goal of the present disclosure to advance the technology of gear trains based on hypocyclic motion where large diameter external gears rotate in mesh with internal gears of slightly larger pitch diameters. This special motion enables multiple teeth to carry a high load at a large moment arm relative to the gear train's center line. Major issues of torque density, lost motion, stiffness, efficiency, complexity, cost effectiveness, and scalability have become important measures of success. To this end, a critical review is presented herein of the basic technologies (cycloidal wave/pin mesh, circular arc gear teeth, parallel eccentric gears, driving crankshaft architectures, lubrication, etc.) that must be prioritized to maximize the gear train's overall performance. Also presented is a strong recommendation for an emerging system to be labeled the Modified Parallel Eccentric (MPE).

B. Background

Two basic technologies now compete for future hypocyclic gear train development. These are the cycloidal wave/pin and the circular arc gear teeth meshes. The cycloidal/pin mesh has been widely used by Nabtesco, Sumitomo (Japan) and now Spinea (Slovakia). For hypocyclic motion, normal involute gear teeth have been shown to be ineffective (Sec. II). Circular arc gear teeth, however, can carry a very heavy load (multiple teeth in contact), are self-protective (more load, more teeth are in contact) and, when preloaded, provide very high stiffness, no backlash, and virtually no lost motion.

Original work by the present investigator (at the University of Texas) concentrated on the hypocyclic motion wobble gear. Although this gear can carry a heavy load, it generates an output ripple due to an offset manufacturing error between the eccentric and the output gear centerlines. Work in Japan (led by Nabtesco and others) showed that the use of two parallel oscillating gears 180° out of phase (without rotation) would not only cancel this ripple, but would also provide a complete dynamic force balance. This result was achieved by using multiple (three) crankshafts to drive the two eccentric gears. This approach resulted in considerable complexity (12 bearings) and a loss of stiffness, and required a front end gear drive. The Nabtesco, Simitomo, and Spinea gear trains all use a cycloidal/pin gear mesh. parallel eccentric drive developed by the present investigator, which featured three crankshafts using circular arc gear teeth, achieved very good results.

C. Simplified Parallel Gear Drive System

Figure 25:
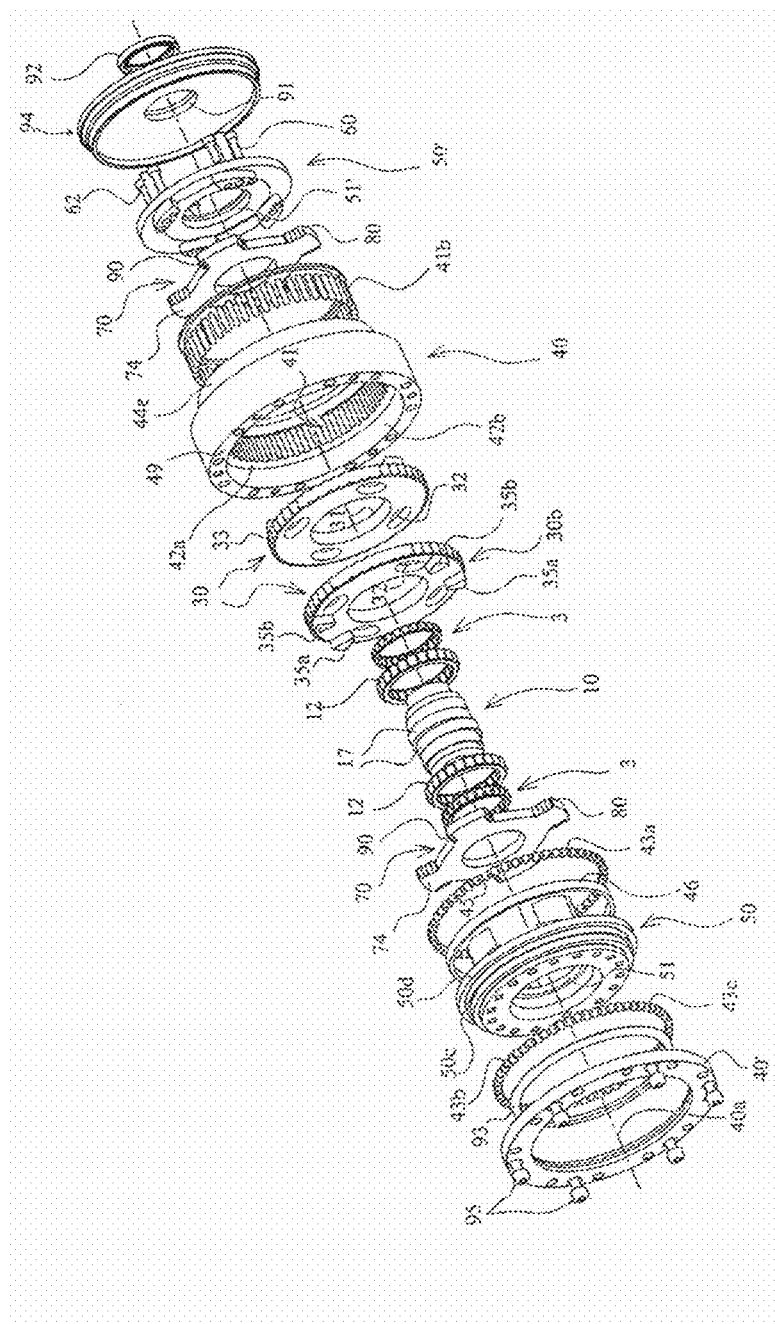
FIG. 25 is an exploded view of a Twin Spin Spinea gear train.

The complexity of three crankshafts and twelve bearings suggests that an alternate drive system might be feasible. This has now been the basis for the Spinea (see FIG. 25) and the Modified Parallel Eccentric (MPE) (see FIG. 1) gear trains. In each case, a central crankshaft with two eccentrics drives the two parallel eccentric external gears to "walk" around the teeth of a large diameter internal gear. These parallel gears are constrained to oscillate (and not rotate) by Oldham couplings between each gear and the gear cage end plates by using embedded tongue/groove splines (perhaps with rollers to reduce friction and wear). The Spinea gear train uses a cycloidal/pin mesh, while the MPE uses the superior circular arc teeth mesh.

The central crankshaft/Oldham coupling approach exemplified in the MPE and Spinea gear trains greatly simplifies the inner structure of the device and puts a high emphasis on the force path through the gear train. The cycloidal/pin mesh (with an estimated 45° pressure angle) used by Nabtesco and Spinea puts a high load (≈100% of the output load) on the crankshaft, while the MPE's circular arc gear teeth (with a 7° pressure angle) puts only 10% of that load on the crankshaft. This means that, in comparison to the Spinea gear train, the force path for the MPE is greatly simplified (going from the gear teeth through the splines and out to the gear cage structure) and offers reduced internal forces and deformations.

D. Spinea/MPE Gear Train Comparison

Figure 24:
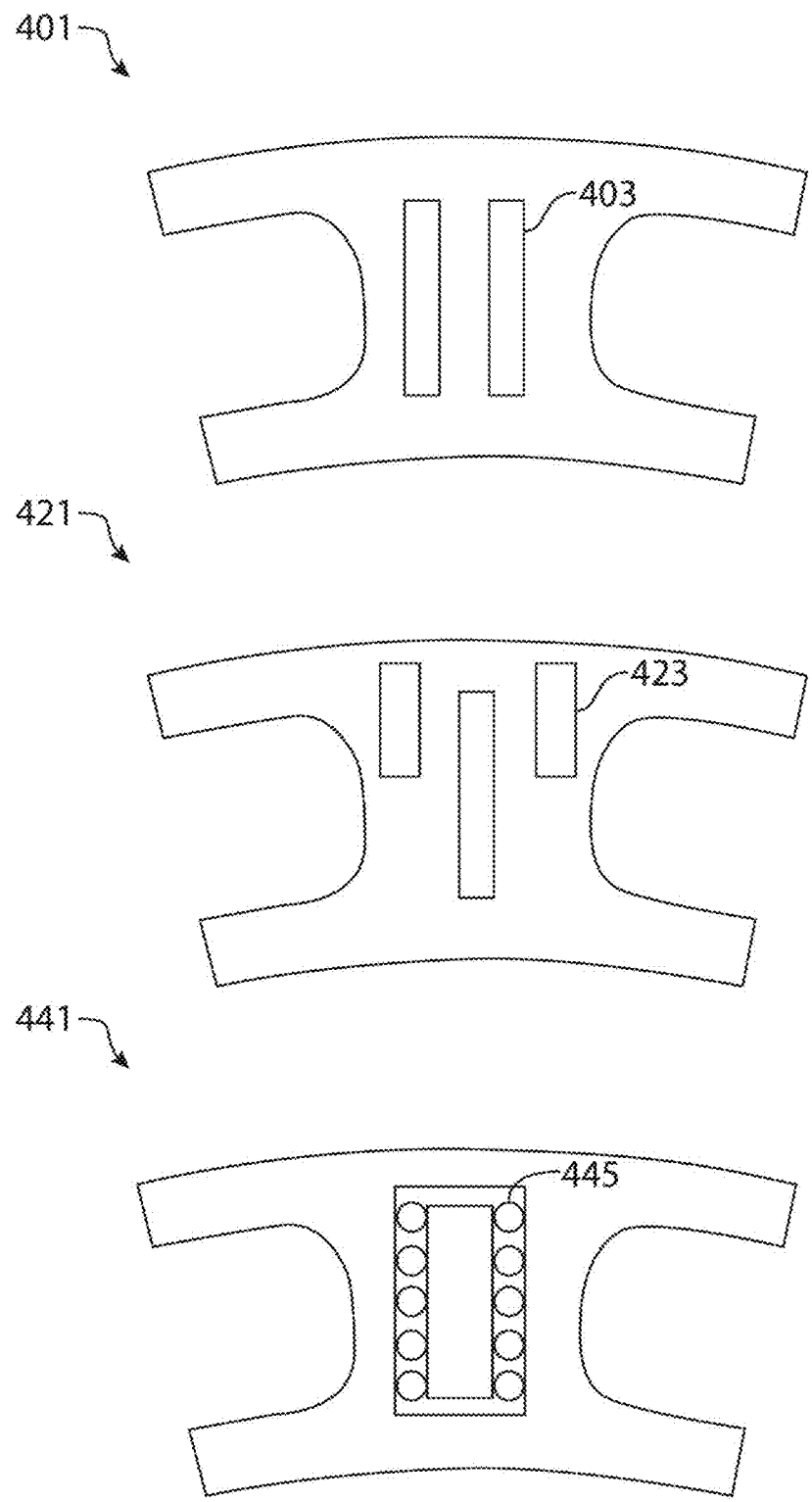
FIG. 24 is an illustration of three particular, non-limiting generalized layouts of splines or roller splines that may be utilized in the gear trains disclosed herein.

There are distinct differences in the compact design of the roller splines to maximize load capacity and minimize deformation as suggested in FIG. 1 and FIG. 24. Compactness and high stiffness leads to high torque density. The unloaded crankshaft for the MPE is primarily a centering device and contributes little deformation in the gear train's force path relative to the high deformation in the Spinea, Nabtesco, or parallel eccentric gear trains. Multiple needles in the splines increase stiffness while reducing volume. It is estimated that that the MPE will be 3 to 4× more torque dense and represent a 6 to 8× greater output stiffness. Furthermore, lost motion for the MPE should be 4× less, if the gear teeth and splines are passively preloaded.

Overall, the cycloidal/pin gearing is shown in the trade literature to be remarkably inefficient (rarely above 90% but in most operation at 70%). This seems to be due to high mesh sliding velocities over multiple contacts. The use of rolling elements in the splines, an unloaded crankshaft, and low contact sliding velocity circular arc gear teeth in the MPE should reduce these losses by 5×. Note that a single compound involute gear mesh has total operating losses between 0.5 and 1%. These results suggest that the standard cycloidal/pin drive has become obsolete, and that the MPE gear train represents a major opportunity for commercial development.

II. Modified Parallel Eccentric (MPE) Gear Train

A. Objective

A long history in actuator development at the high end has resulted in a simple hypocyclic gear train and a parallel eccentric gear train, both of which may utilize the remarkable circular arc gear teeth to carry a heavy load with high stiffness. Each of these gear trains has desirable attributes, as well as some remaining technical issues that may be overcome by combining the best features of each into a Modified Parallel Eccentric (MPE) gear train.

B. Background

Electro-mechanical actuators are dependent on gear reducers to amplify low prime mover torques at higher speeds into higher output torques at lower task-related speeds. Normal gear trains use standard involute gear teeth, which may be produced in high quantities at low cost. Maintaining a contact ratio approaching 1.4 requires longer teeth, which results in low tooth bending strength (only one tooth carries the load 70% of the time), very high sliding velocities (causing higher friction and wear), high contact stresses (convex to convex surface contact), and an essential amount of backlash to permit operation without tooth interference.

It has been found that circular arc gear teeth may be utilized to eliminate most of these deficiencies. Since the use of circular arc gear teeth allows several teeth to carry the load, the maximum tooth load goes down about 50% to 70%. These teeth may be three times shorter than involute teeth, resulting in a 5× reduction in bending stresses. The conformal contact of these gear teeth (convex with concave) allows contact stresses to be reduced by 2-5× in comparison to the contact stresses experienced by involute gear teeth. Further, when these teeth are in hypocyclic motion (a large gear rolling inside a second slightly larger gear), the teeth enter the mesh perpendicular to the gear pitch circle and reach a point of zero sliding velocity (this may be thought of as a cusp motion in a cycloidal curve), which means that these gear teeth carry a maximum load at no sliding velocity. In light of the foregoing, it is an objective herein to utilize circular arc gear teeth in hypocyclic motion in combination with the best possible gear train geometry to derive an improved series of rotary actuators.

C. Hypocyclic Gear Train

FIG. 1 depicts an example of a prior art hypocyclic gear train 101. As seen therein, the hypocyclic gear train 101 is unusually simple, using a single central eccentric 103 to drive a wobble gear 105 (containing two external gears 107, 109) through a bearing 111 (usually a needle bearing) so that one external gear 107 meshes with a stationary internal gear 113 and the second external gear (usually a little smaller in diameter) meshes with an output internal gear 115. These simple hypocyclic gear meshes can produce reductions of 5000 to 1 in one stage. They are very rugged, using a large diameter, small cross-section cross-roller bearing to create a shortest force path between the fixed and output internal gears.

Despite the simplicity, high stiffness and high durability obtainable with hypocyclic gear trains, in practice, it is difficult to accurately manufacture the gears to have pitch circles which are perfectly centered on the center of the crankshaft eccentric. Unfortunately, deviations from this alignment create a ripple in the output motion (in some implementations, for example, such deviations result in a ripple of about 1%). The presence of such a ripple makes hypocyclic gear trains unsuitable for some applications.

D. Parallel Eccentric Gear Train

Figure 2:
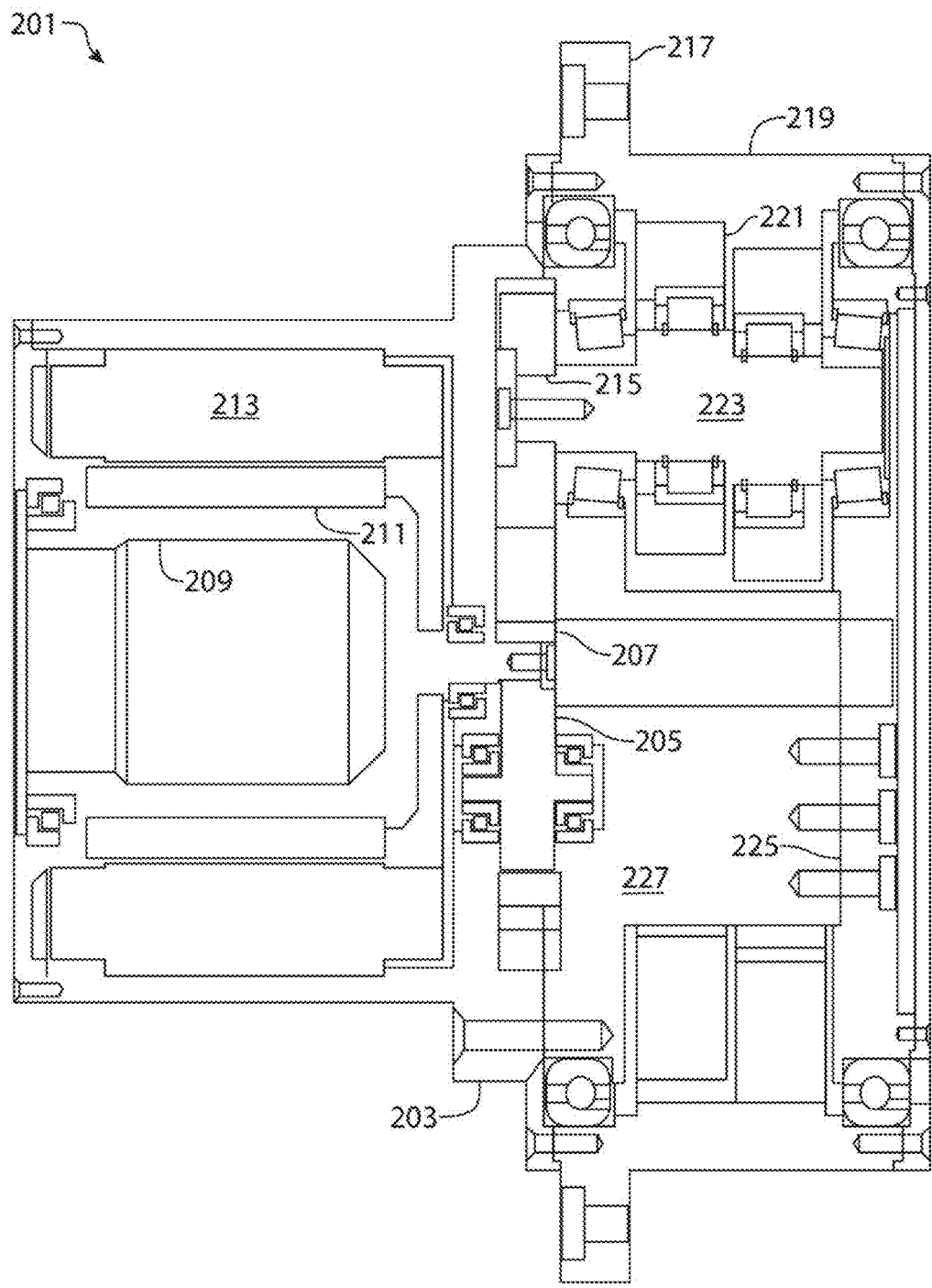
FIG. 2 is a cross-sectional illustration of a prior art rotary actuator with a parallel eccentric gear train and a circular arc gear tooth profile.

FIG. 2 depicts an example of a prior art parallel eccentric gear train 201. As seen therein, the parallel eccentric gear train 201 depicted comprises an actuator shell 203, idler gears 205, an input gear 207, an input shaft 209, a rotor 211, a stator 213, crankshaft gears 215, an output attachment 217, an output gear 219, dual PE gears 221, crankshafts 223, a right cage 225 and a left cage 227 (bridge structure).

The parallel eccentric gear train was conceived by the present investigator independently of the cycloidal drives which originated in Russia and which are currently mass produced by such Japanese manufacturers as Nabtesco and Sumitomo. The Nabtesco cycloidal drives have demonstrated an exceptional durability of 100,000 hours under heavy duty cycles.

However, despite their demonstrated durability, the aforementioned cycloidal drives use pins which act on cycloidal curves. This arrangement results in low load capacity, low stiffness, and high lost motion. This arrangement also requires a set of front-end involute gears to drive a set of three symmetric crankshafts, which then oscillate two parallel cycloidal gears without rotation. This high level of complexity results in a gear train with no less than 14 bearings, which are relatively compliant (not stiff) and represent a high number of single points of failure.

E. Modified Parallel Eccentric Gear Train

Figure 12:
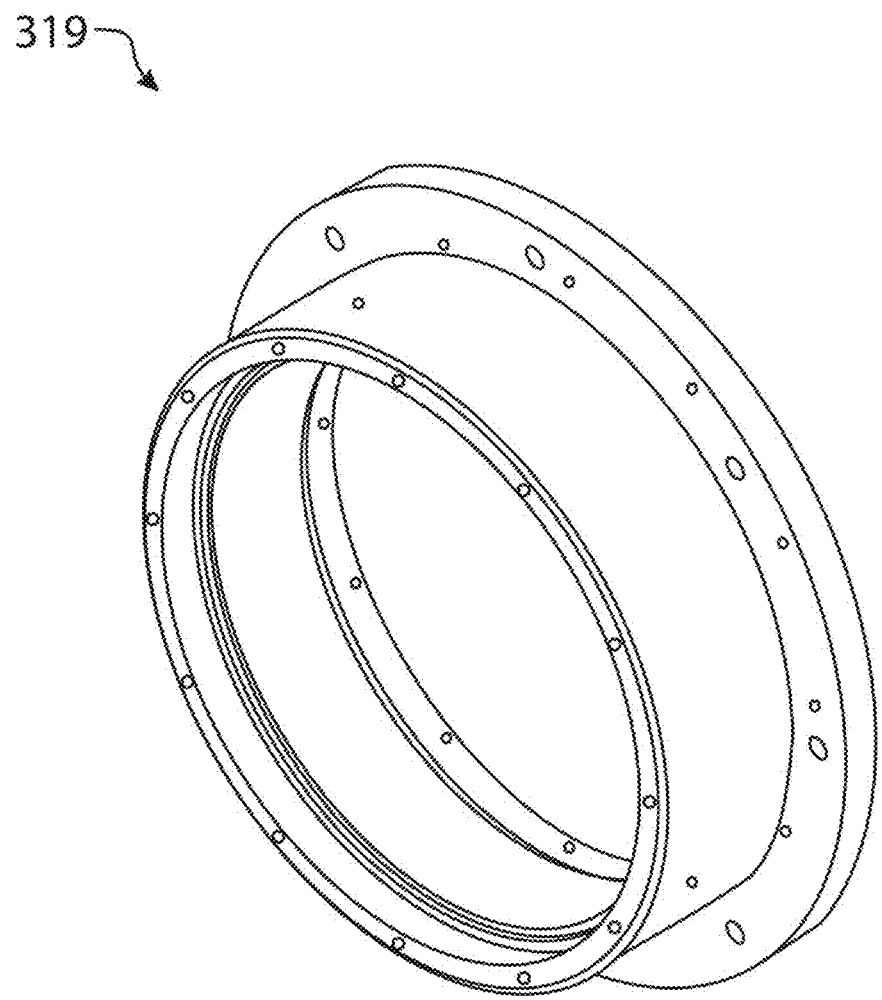
FIG. 12 is a perspective view of the output ring gear of FIG. 11.
Figure 28:
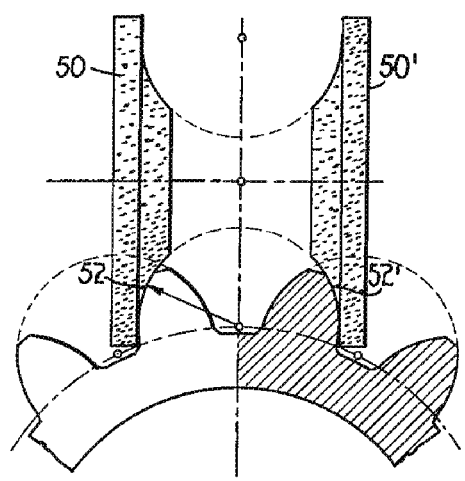

The present investigator has derived a successful solution to the foregoing problems by combining elements which are sprinkled throughout the literature, but have heretofore not been combined in the manner suggested herein. In particular, hypocyclic motion is described in U.S. Pat. No. 276,776 (Clemmons), which issued in 1883, and the existence of circular arc gear teeth are described in U.S. Pat. No. 1,601, 750 (Wildhaber), which issued in 1926. FIG. 12 of Wildhaber is reproduced herein as FIG. 28, where the circular arc profile 52, 52' of the gear teeth is obtained with grinding wheels 50, 50'. However, despite the fact that these elements have individually been known to the art for a long time, the art has failed to appreciate the advantages obtainable by integrating these features into the hypocyclic gear train or into a unique parallel eccentric gear train of the type disclosed herein. The modified parallel eccentric gear train with circular arc gear teeth exhibits gear teeth of exceptional load capacity, stiffness, durability, and virtually no lost motion (and especially, no backlash). These attributes represent substantial improvements over the corresponding properties of the Nabtesco cycloidal drive.

Despite these advantages, the resulting parallel eccentric gear train still needs front-end gears, three parallel crankshafts, and a set of 14 critical bearings. However, it has now been found that the best features of the hypocyclic gear train, the parallel eccentric gear train, and circular arc gear teeth may be combined in the manner described herein to create an intermediate gear train which, in a preferred embodiment, dramatically reduces the weaknesses of both gear train types and eliminates as many internal bearings as possible (indeed, in a preferred embodiment, no internal bearings are present in the force path). In particular, it has now been found that the foregoing problems may be overcome by the Modified Parallel Eccentric (MPE) gear train disclosed herein. This gear train which, in a preferred embodiment, utilizes circular arc gear teeth to carry a heavy load with high stiffness, combines the best features of the simple hypocyclic gear train and the parallel eccentric gear train into a new gear train with desirable performance metrics.

In a preferred embodiment, the MPE gear train employs circular arc gear teeth on a pair of oscillating (but not rotating) parallel external gears. The external gears mesh with a single output internal gear supported by two parallel, widely spaced, large diameter rolling element bearings of small cross-section (preferably opposed tapered roller bearings) to create an exceptionally rugged output structure. The MPE gear train may be driven by a single central crankshaft with two eccentrics to drive the two parallel gears. These eccentrics may use a pair of high-stiffness needle bearings to drive the gears. Otherwise, there are no other low stiffness, failure prone bearings in this embodiment of the gear train (in particular, the whole gear train contains only six rolling element bearings). Moreover, since the MPE gear train is a parallel eccentric gear train, the parallel gears are perfectly balanced dynamically, and there is no output ripple (since the gear meshes are 180° out of phase and cancel any eccentric error influence on the output motion).

The foregoing preferred embodiment of the MPE gear train disclosed herein has other advantages as well. For example, the structure of this gear train is exceptionally rigid, with much higher output stiffness than that for the Nabtesco gear train. The MPE gear train will not require any front-end gears, may provide a gear ratio from 30 to 150 to 1 and, using a reverted star compound front-end gear train, may provide ratios from 30 to 1 up to 3000 to 1. By itself, the MPE gear train should be more compact than the Nabtesco gear train or the earlier parallel eccentric gear train previously developed by the present investigator, thus producing more torque in a smaller volume (and therefore, a lower weight). Moreover, the minimum set of 6 bearings may substantially increase durability and reduce cost. Since now only the circular arc gear teeth resist the load (not also the 12 bearings on the 3 crankshafts), the stiffness of the MPE gear train should be high.

E. Gear Teeth in a Specific Design

A 6000 ft-lb. parallel eccentric prototype actuator was built to evaluate the unique properties of the circular arc gear teeth. The gear train's outer diameter was 11.5", and its width was 5.5" (not counting the prime mover). The 7° pressure angle on the gear teeth produces about a 10% closing force. The contact force, in this case for a 10" diameter parallel eccentric (PE) gear, would be 7200 lb. on each of two gear meshes. Given the tooth width of 1" for a tooth height h=⅛", the tooth contact surface breadth of 1/16", the average contact stress on 3 teeth in contact would be 12,800 psi, which is very low.

Since the gear closing forces is about 10% of the contact load force, the crankshaft eccentric bearings need to carry 10% of the 7,200 lb. contact force. Further, these eccentric forces balance each other so there is no effective load on the crankshaft itself, or on the supporting end bearings for the crankshaft. Hence, the crankshaft in this actuator is primarily a centering device and not a critical load carrying component to contribute to deformation in the gear train or to its wear and degradation.

The gear teeth contact sliding velocity as they engage is dependent on the size of the eccentric e which will be somewhat bigger than ½ the tooth height h for a single tooth step engagement. If the angular velocity of the crankshaft is ω, then the maximum closing velocity $v_c$ would be ωxe≈ωx h/2. If h=0.25" and ω=1000 RPM, then the maximum closing velocity would be:

$$v_c = \frac{0.125 \times 1000}{60 \times 2} = 1 \text{ in/sec} \quad \text{(EQUATION 1)}$$

which is perhaps 2x the actual contact sliding velocity $v_s$=0.5 in/sec. This is considered to be an extremely low sliding velocity for contacting gear teeth.

F. Modified Cross Links/Splines

Figure 3:
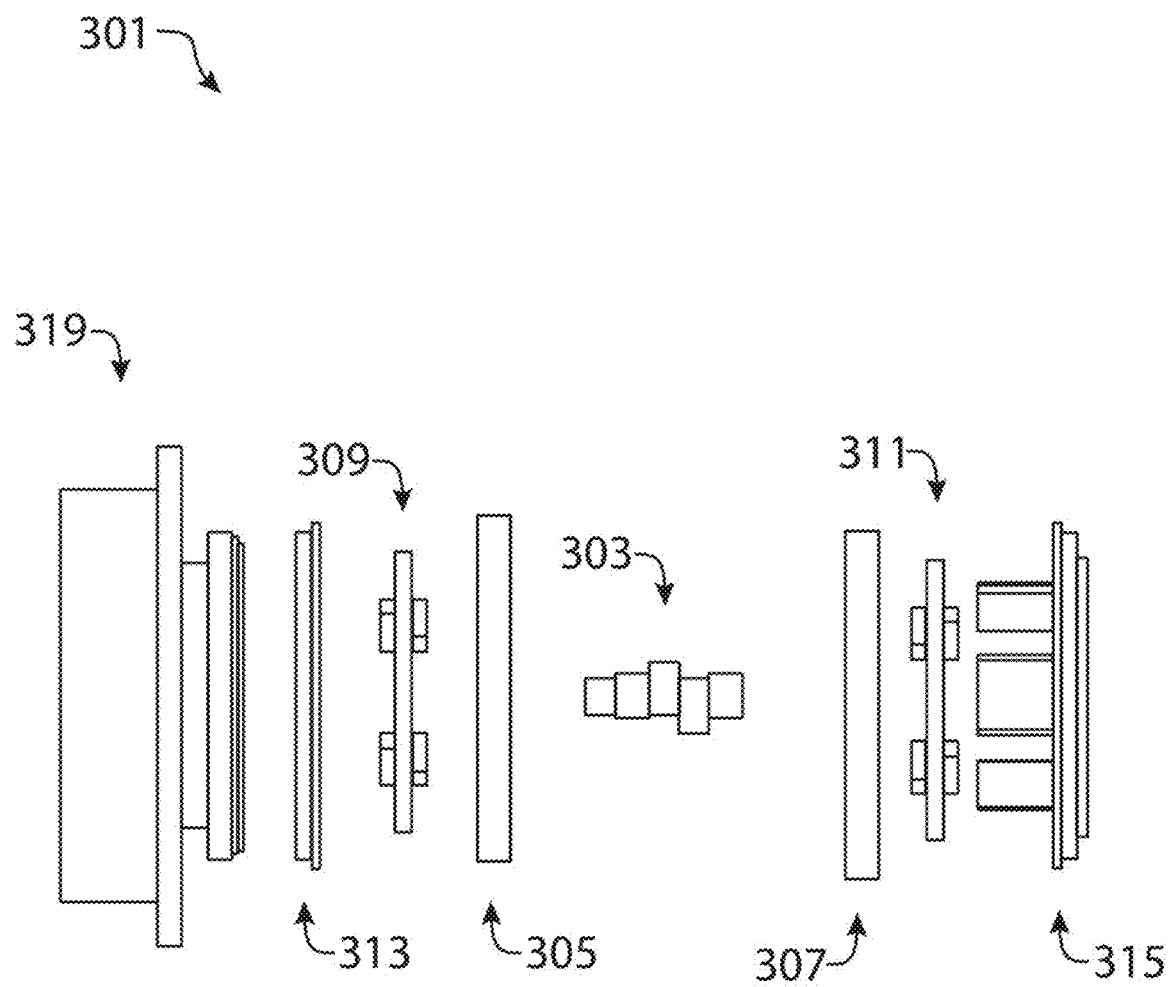
FIG. 3 is an exploded side view of a modified parallel eccentric rotary actuator in accordance with the teachings herein.

FIG. 3 depicts a particular, non-limiting embodiment of a modified parallel eccentric (MPE) gear train in accordance with the teachings herein. The MPE gear train 301 depicted therein comprises a crankshaft 303, first 305 and second 307 eccentric gears, first 309 and second 311 cross links, and first 313 and second 315 end plates. The second end plate 315 is attached to a motor shell 317, which permits the output gear 319 to rotate relative to the first 313 and second 315 end plates.

Figure 23:
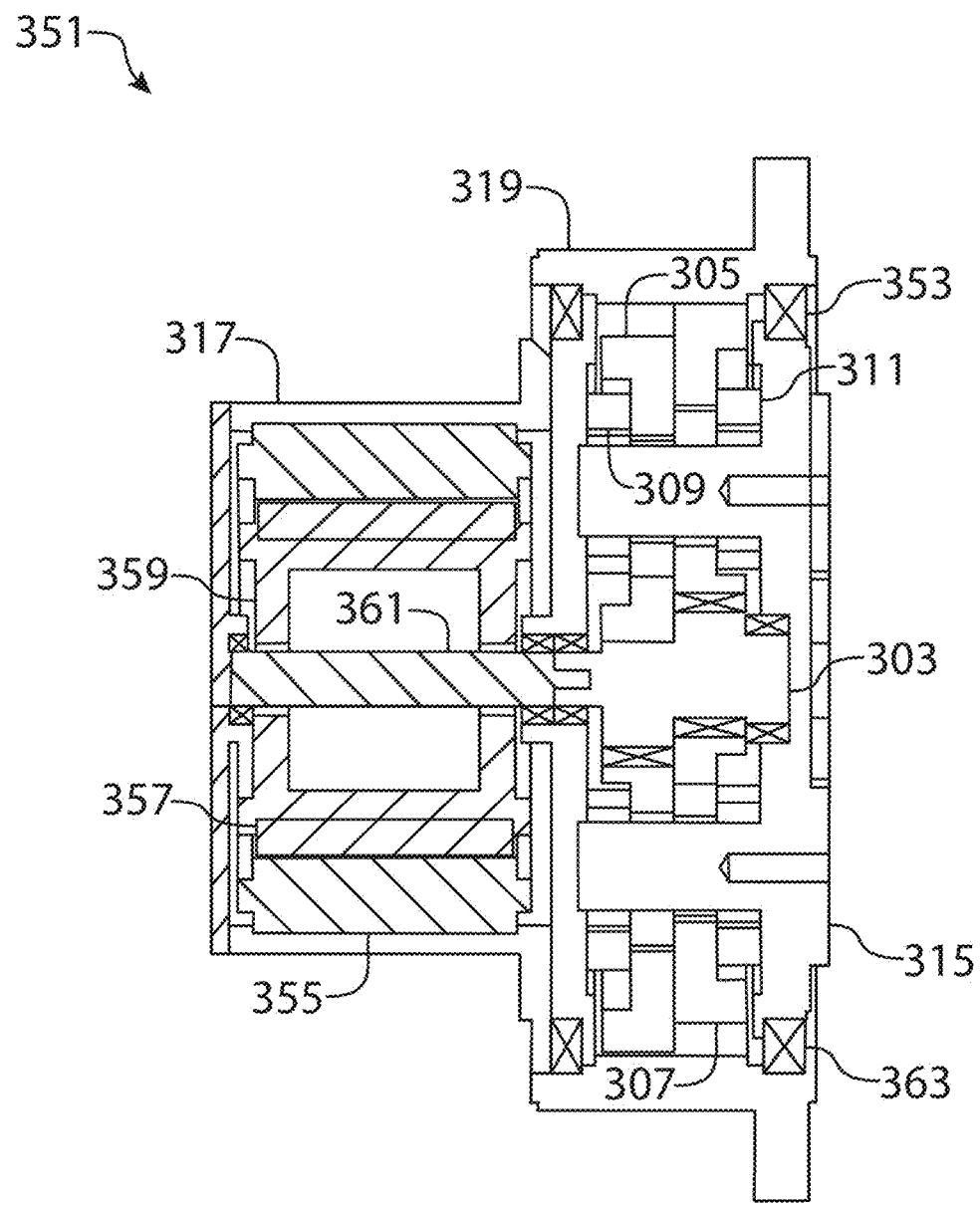
FIG. 23 is a cross-sectional view of a modified parallel eccentric rotary actuator in accordance with the teachings herein.

FIG. 23 depicts a rotary actuator which incorporates the gear train 301 of FIG. 3. In addition to the crankshaft 303, the first 305 and second 307 eccentric gears, the first 309 and second 311 cross links, the first 313 and second 315 end plates, the motor shell 317, and the output gear 319, the rotary actuator 351 further comprises principal bearings 353, a stator 355, a rotor 357, a rotor support 359, a motor shaft 361, and cross-roller bearings 363.

Figure 4:
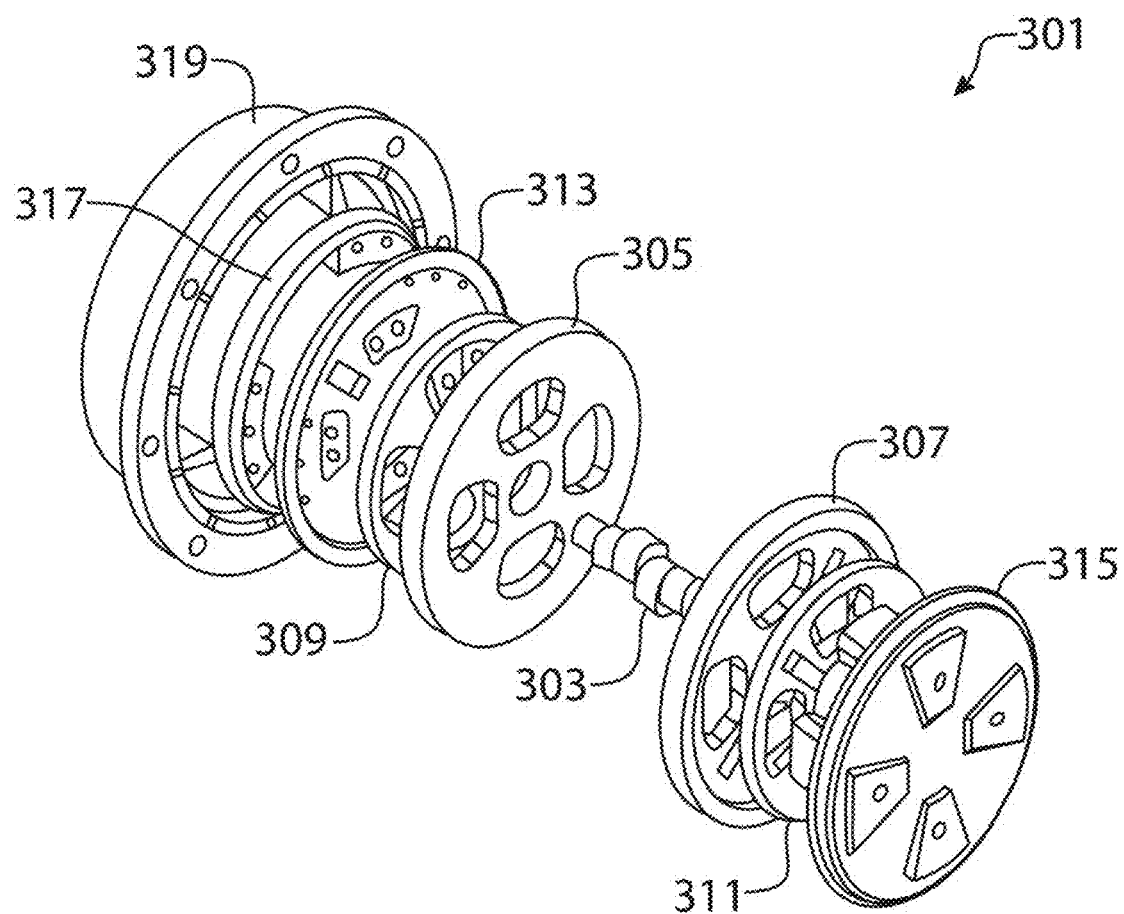
FIG. 4 is an exploded perspective view of the modified parallel eccentric rotary actuator of FIG. 3.

As seen in FIGS. 3-4, the frame of the MPE is very similar to that of the PE. There is a high-speed prime mover which drives a single central crankshaft supported in two cage end plates. The crankshaft has two eccentrics 180° out of phase which drive two parallel eccentric gears (which are also out of phase) without rotation. The rotation is prevented by the use of two cross links (one for each gear) with splines (tongue and grooves) on both faces of the cross links. One set of splines engage the stationary end plates and the other set of splines on the cross link engage the oscillating gears, preventing rotation.

The parallel gears mesh with the outer internal ring gear with two meshes 180° out of phase. Since all the moving masses move along their splines in small motions (the height of the gear teeth), very little inertia forces are involved (i.e., the gear trains effective inertia is very low). The splines and gears are both out of phase by 180°, so they are perfectly balanced radially. Finally, two offset large diameter small cross-section tapered roller bearings constrain the motion of the output ring gear relative to the stationary gear cage (each bearing is supported by its neighboring cage end plate). The right cage plate carries the attachment for the reference link. The output link attachment ring is as close as possible to the attachment for the reference link through the large diameter bearings (cross roller bearings may be used at the right end plate) to form the shortest possible force path through the gear train.

Figure 5:
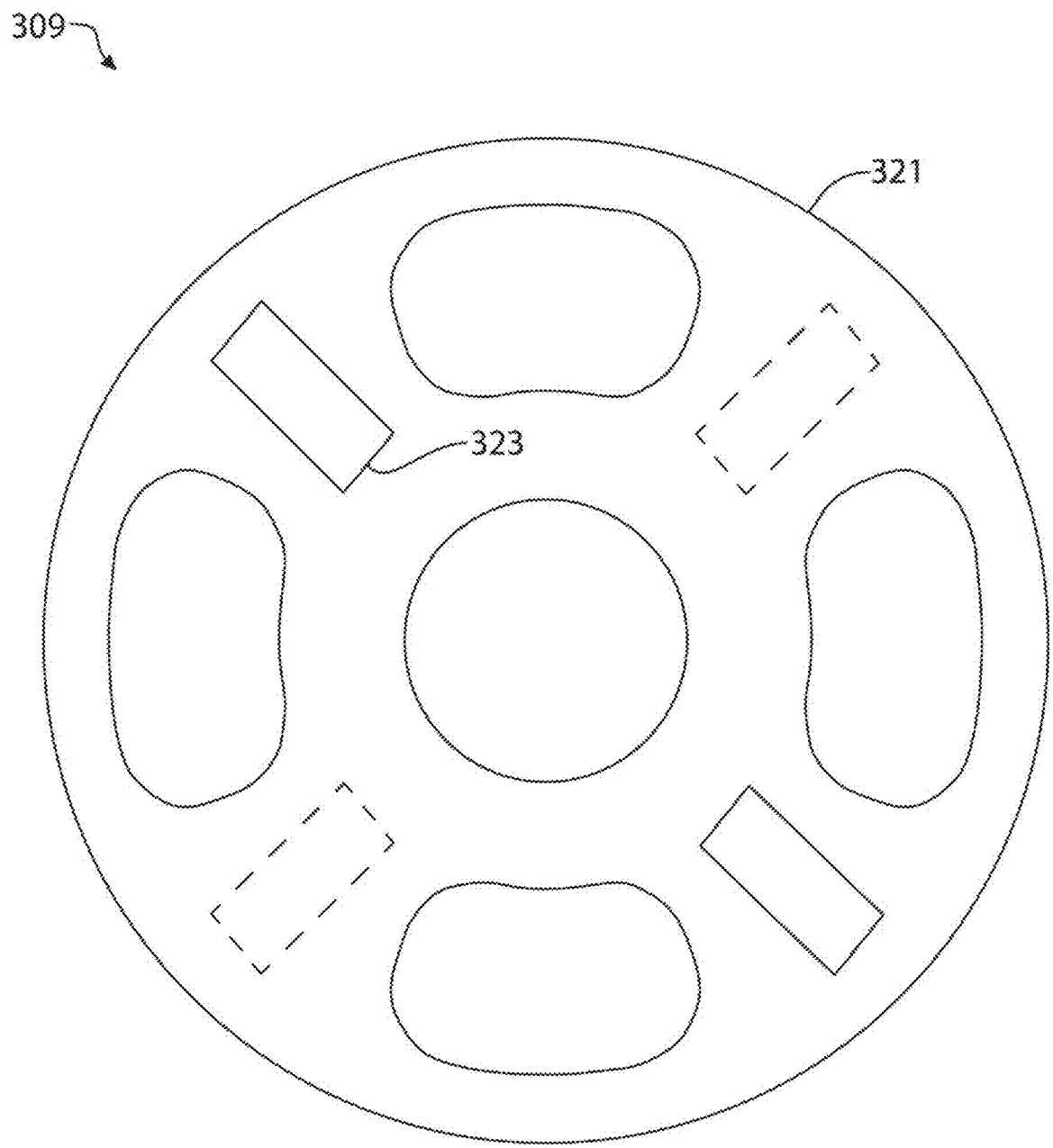
FIG. 5 is a front view of a crosslink used in a rotation constraint mechanism in the modified parallel eccentric rotary actuator of FIG. 3.

As seen in FIG. 3, the MPE gear train 301 has parallel eccentric gears 305, 307 which are preferably allowed to oscillate without rotation. An old principle by Oldham may be utilized to provide this constraint. Each of two cross links 309, 311 in this particular embodiment are identical. As seen in FIG. 5, which shows the first cross link 309 in greater detail, each of the cross links 309, 311 is a circular disk 321 with two sets of parallel tongues 323 (one set on each cross link face at 90° to each other). These tongues 323 will slide into matched grooves on their neighboring parallel eccentric gear or cage end plate. These tongue and groove combinations will be considered as splines. These splines must carry the full load on the actuator. The load goes from the output ring gear through the circular arc gear teeth through the splines and finally to the stationary reference gear cage end-plates. Hence, the gear teeth and the splines are in the direct load path of the actuator. The basic design principle here is to ensure that the splines are substantially equal in load capacity, deformation, and contact stresses as are the functioning circular arc gear teeth, which now must be the best feasible configuration to maximize load capacity, minimize deformation, wear, sliding velocity, noise, and the like.

Each cross link carries a mesh of two dual splines (one dual spline on each side of the crankshaft centerline). Each spline must carry half of the total load (there are two cross links) or, in the case of the prototype, 3000 ft-lb. torque. The radial center point of the spline would be at 3.5" from the actuator centerline. Each spline would carry half of the cross link's torque, or 1500 ft-lb or 5,137 $lb_f$ contact force at 3.5". If each tongue is 0.4" high and 1" in length, this contact area of 0.4 $in^2$ would result in an average contact stress of 6,421 psi, which is also quite low.

Various spline geometries may be utilized in the MPE disclosed herein. The splines may be strictly parallel sided or tapered (see FIGS. 6-7). For parallel sided splines, a clearance of 0.002" would result in a free motion of 0.034" at a moment arm of 60". In many cases, this would be acceptable. Because the tongue can enter the groove as far as it needs, the cross link can make full face contact with its neighboring links (the PE gear and the cage end-plates), resulting in a somewhat stiffer gear train. If the spline is tapered, then both sides of the tongue and groove are in loaded contact. This will result in no free output motion (backlash) but a somewhat more compliant gear train, since the cross link flat face surfaces are not in contact with the flat surfaces of its neighboring link.

Of course, the primary function of the splines is to allow small motion along their length (~16 h) of approximately the tooth height h. The peak sliding velocity is very low and its travel is small (~h), so low wear may be expected. Note that quality surface treatment and lubrication may be warranted.

Using a tapered spline raises the question of maintaining contact when wear occurs over time. This may be achieved by using two linear (or a circular wave) springs between the PE gears. The springs would create a separating force to move the gears apart on their non-constraining needle bearings. Each PE gear would then produce a closing force on all the tapered splines on their neighboring cross links to essentially completely eliminate backlash. Since the circular arc gear teeth have no backlash, and these tapered splines would have no backlash, then the whole gear train would have no backlash. The angle in the taper, the required closing force, the effect on lubrication, and other such details would benefit from careful analytical and experimental analysis.

G. Overall Nature of the Modified Parallel Eccentric

FIG. 5 depicts the cross-link (used as a rotation constraint mechanism) in greater detail. With reference thereto, the Oldham constraint of two perpendicular splines on an intermediate link (here, the cross link) is usually used to turn two offset shafts at a constant/identical speed. This arrangement is used here to ensure that the parallel gears are able to oscillate without rotation relative to the gear cage end plates. Note that the spline tongues (or grooves) are on opposite sides of the cross link. Also, to hold end plates rigidly together requires bridge components to bolt the cage end plates together during assembly. These four bridge components pass through openings in the cross link. Similar openings are required in the parallel gears.

Figure 6:
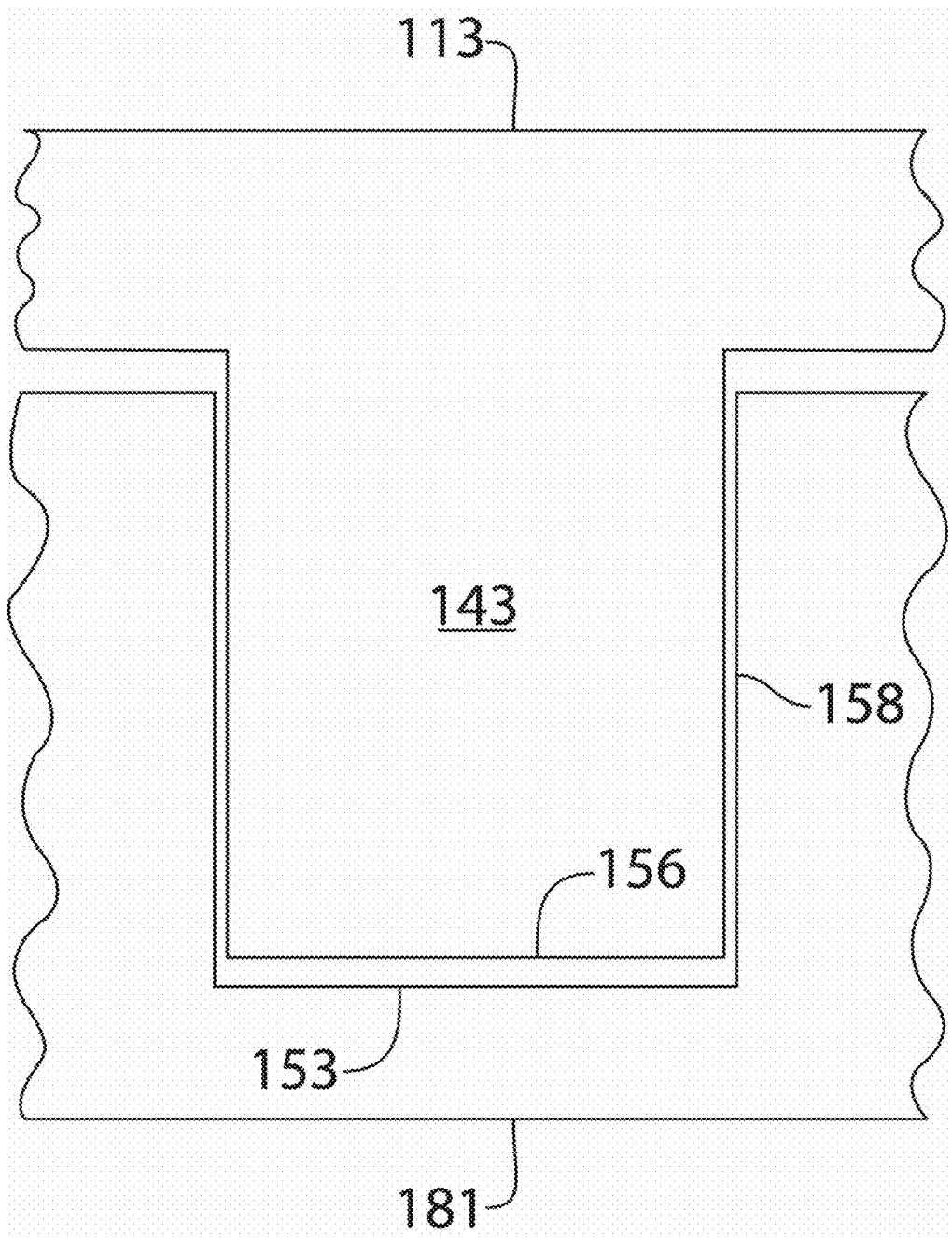
FIG. 6 is a cross-sectional view of a parallel sided "spline" (or protrusion) and complimentary groove which may be utilized in the modified parallel eccentric rotary actuator of FIG. 3.
Figure 7:
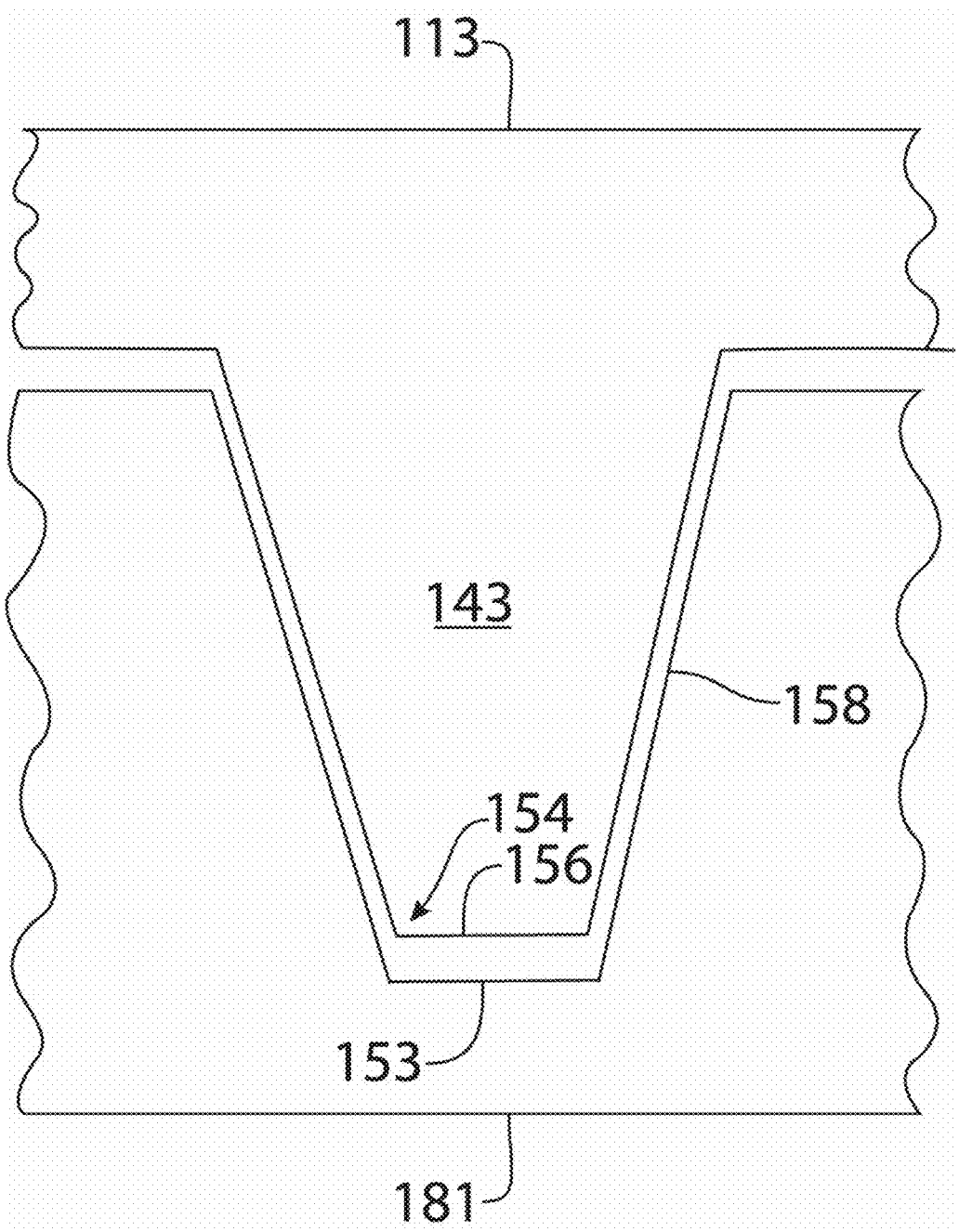
FIG. 7 is a cross-sectional view of a tapered "spline" or protrusion which may be utilized in the modified parallel eccentric rotary actuator of FIG. 3.

With respect to FIGS. 6-7, the need for reasonable precision and nominal backlash at lower cost and easier lubrication suggests a tongue/groove with parallel sides and a modest tolerance gap. The cross link face would, then, physically ride on the face of the neighboring gear or cage end plate, providing some stiffening effect. Then, the tongue would necessarily have a gap with the bottom of the groove. Pressurized oil could be supplied in this gap or openings in the low clearance parallel sides. The alternative is a small taper to the tongue and groove which, when properly preloaded, represents no backlash. The issue, then, becomes using wave springs between the parallel gears to maintain contact along the tapered surfaces while they wear. This can be done if pressurized oil enters through the tapered faces. The use of caged rollers inside the contacting faces of the splines may reduce friction and wear, and may enhance durability.

Figure 8:
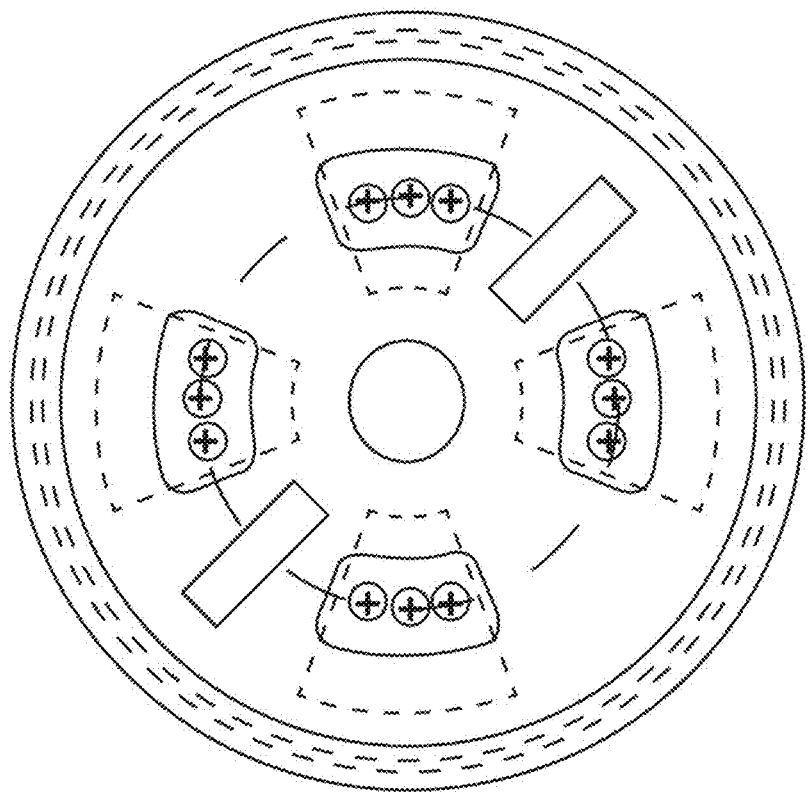
FIG. 8 is a front view of the right end cage support plate of the modified parallel eccentric rotary actuator of FIG. 3.
Figure 9:
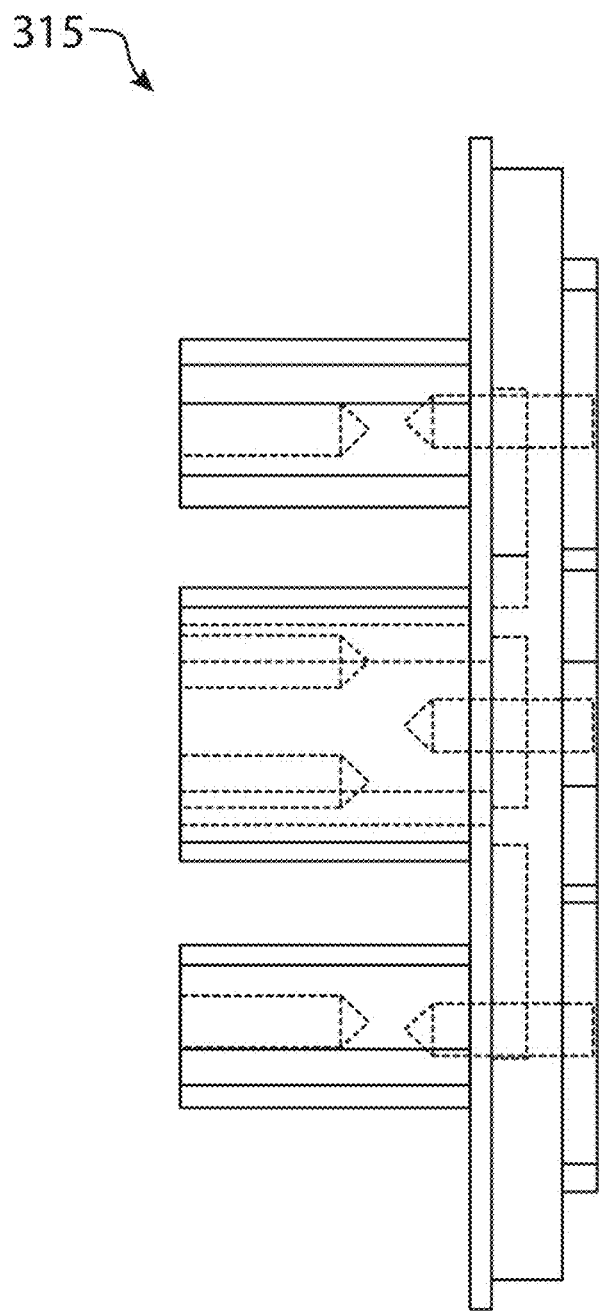
FIG. 9 is a side view of the right end cage support plate of FIG. 8.
Figure 10:
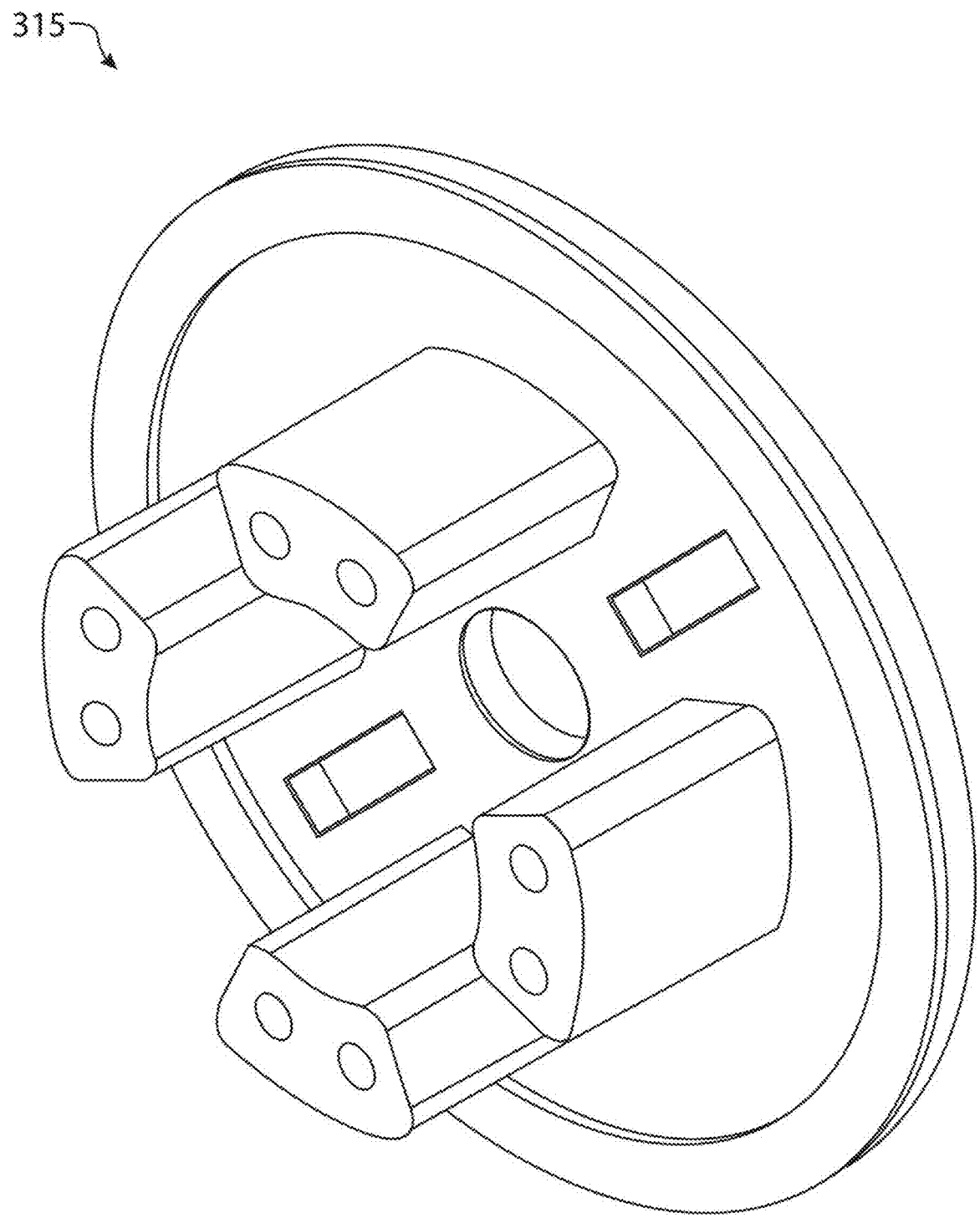
FIG. 10 is a perspective view of the right end cage support plate of FIG. 8.

FIGS. 8-10 depict the right cage support disk. This disk is the anchor for the gear train structure. It either has the cross bridges between the cage end plates integral or separate. The two end plates are bolted together by eight through bolts (through the bridges). Each end plate supports a crankshaft bearing. This end plate also supports one of the principal large diameter output bearings (possibly a cross roller bearing) and special reference link attachment lugs (wedges) to strengthen the link/end plate interface (make it more precise and rigid). If the cross bridges are not integral with the right cage end plate, there are support sockets to rigidize the assembly.

It will be appreciated that the force path between the reference link (attached to the right gear train cage, FIGS. 8-10) and the output link (attached to the internal ring gear, FIGS. 11-12) now goes directly through the dual circular arc gear teeth meshes (FIGS. 13-15) and the symmetrically positioned cross links (FIG. 5) containing the loaded splines. The splines have been shown to be capable of high load capacity with a low concern for wear and a high potential for good durability. Each gear mesh carries 50% of the load. Clearly, this configuration highlights the central importance of the circular arc gear teeth. Their load capacity, friction, deformation, backlash, lost motion, potential for wear, lubrication, etc. now dominate the gear train design and performance.

Interestingly, all load and dynamic forces on the PE gears are balanced since they are 180° out of phase. Also, all load and dynamic forces on the cross links are balanced since they are necessarily 180° out of phase. The crankshaft bearings that drive the PE gears do need to generate small acceleration forces to cause the small gear oscillations and to generate the low gear teeth closing forces (about 10% of the tooth contact forces). This means that the crankshaft is perfectly load balanced, experiences almost no bending forces, and its end bearings are lightly loaded.

The other two bearings in the gear train constrain the motion of the unloaded (from internal gear forces) ring gear relative to the cage end-plates. The critical right end-plate is designed to support the large diameter bearing (possibly a cross roller bearing) next to the output attachment ring to create the shortest possible through force path. Hence, these large diameter bearings' primary function (and they do it superbly) is to resist external loads between the input link and reference link. These loads are either radial or out-of-plane moments, none of which affect the internal operation of the gear train. Hence, only two external and four crankshaft bearings are in this gear train, and none of the crankshaft bearings are critical to its operation. This is in contrast to the role of the twelve critical crankshaft bearings in the earlier parallel eccentric gear train and the Nabtesco gear train.

Figure 11:
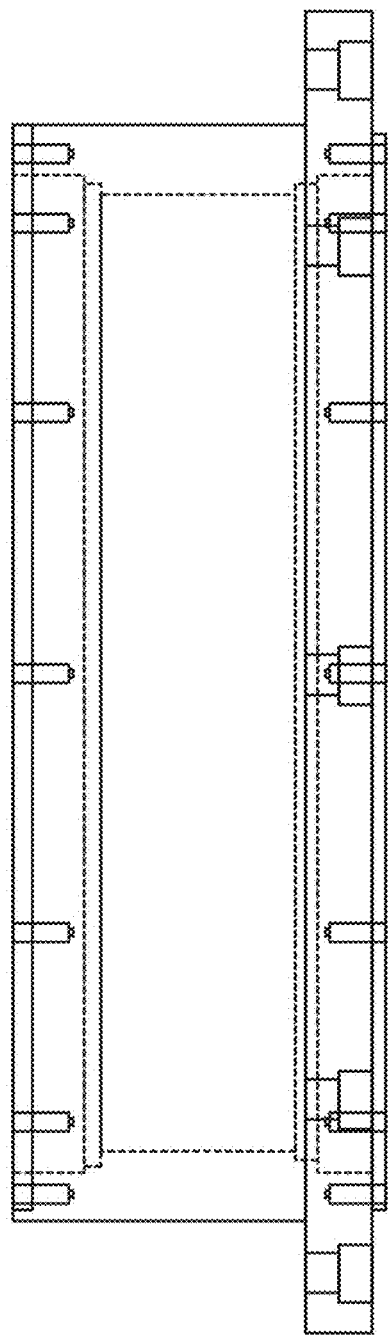
FIG. 11 is a cross-sectional view of the output ring gear of the modified parallel eccentric rotary actuator of FIG. 3.

The output ring gear of FIGS. 11-12 meshes with both of the oscillating parallel gears. It is of very simple construction using two parallel large diameter small cross-section tapered roller bearings for support on the cage end plates. This symmetry and simplicity results in a very strong structure resisting forces and moments in all six directions.

Figure 13:
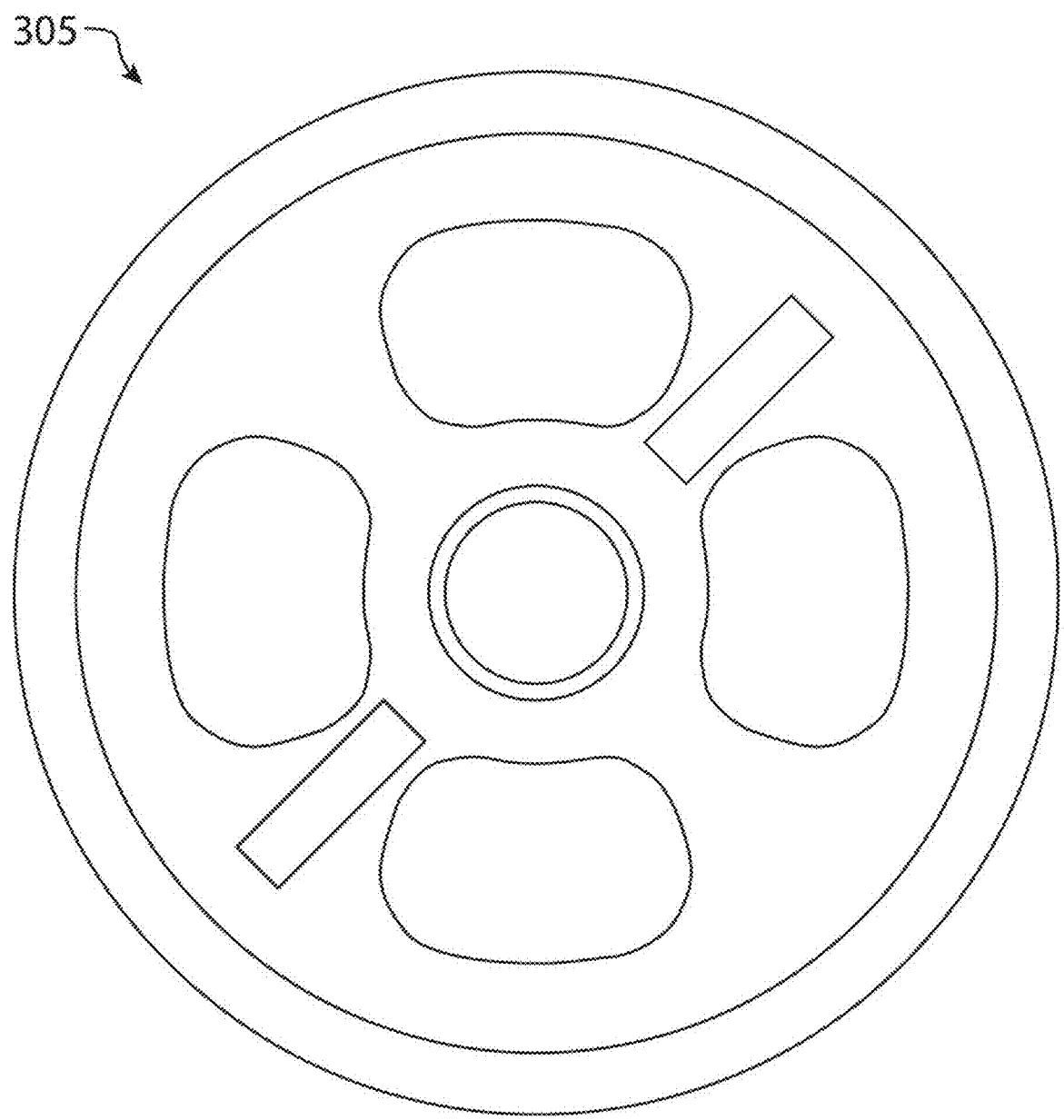
FIG. 13 is a front view of the dual eccentric parallel gear of the modified parallel eccentric rotary actuator of FIG. 3.
Figure 14:
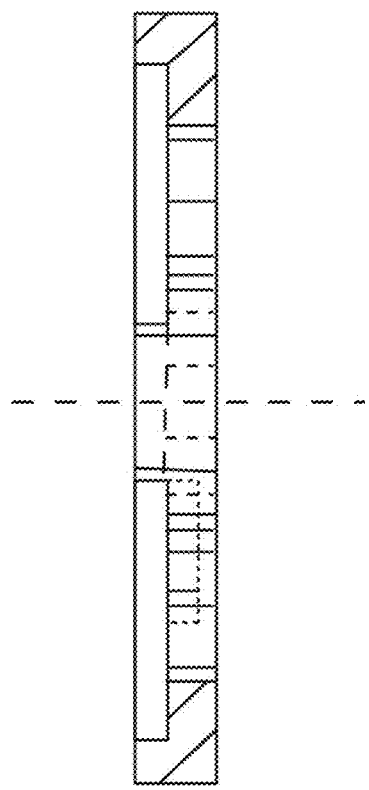
FIG. 14 is a cross-sectional view of the dual eccentric parallel gear of FIG. 13.
Figure 15:
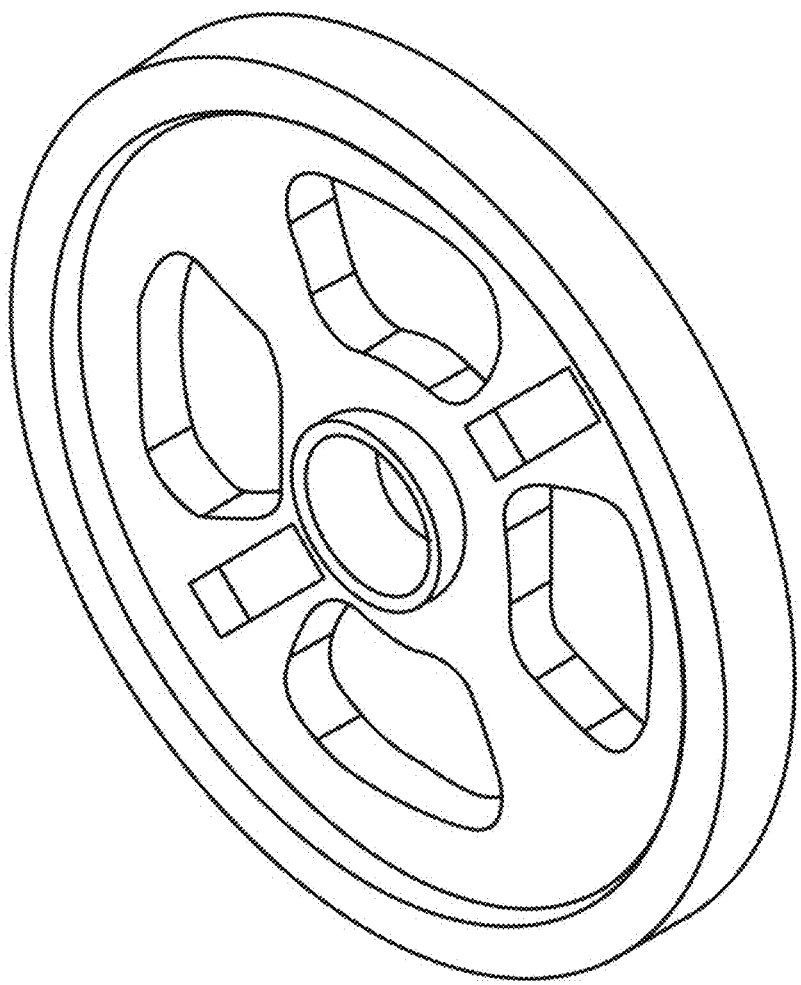
FIG. 15 is a perspective view of the dual eccentric parallel gear of FIG. 13.

FIGS. 13-15 depict the layout of the dual symmetric parallel gears. The two parallel gears are mirror images of each other. Each gear has external teeth to mesh with the output internal gear, each gear has either one spline groove or one spline tongue to mesh with its neighboring crosslink, and each gear has a centered bearing hole to hold the crankshaft eccentric needle bearing. Each parallel gear also has four openings for the four bridges that tie the end plates together. The structure of these gears is intended to be rugged and stiff. They may be separated by a wave spring near the bearing to preload the splines. The needle bearings would permit a small lateral motion for that purpose.

H. Modified Parallel Eccentric (MPE) Utilization

The use of the MPE disclosed herein will now be described. Here, it is to be noted that the number of gear teeth on a PE gear is of central concern to its design. For 30 teeth and one tooth step per revolution, then a 30-to-1 reduction ratio is possible. Or, with 100 teeth and a 3-tooth step per revolution, then this provides a 33-to-1 reduction. Both designs result in a larger eccentric and, therefore, larger gear oscillation and longer spline motions which in critical applications may be undesirable. It is feasible to use up to 150 teeth and obtain a 150-to-1 reduction ratio with a one-tooth step for each revolution. This then provides a ratio range of 30 to 150-to-1. Then, using a reverted star compound gear frontend of up to 20-to-1 reduction, the useful reduction ratio range can be expanded to 30 up to 3000-to-1. Note that this means that a very light, high speed, low inertia frontend now complements a very rugged, high stiffness, low speed and high load capacity backend to create a very versatile gear train for a very wide range of applications. Also, the inertia content of this combination has now become extremely low. Even though the frontend may be at 10,000 RPM, the backend MPE, itself, may be at 500 RPM. The internal inertia forces on the crankshaft bearings and on the splines now are not only completely balanced, they are very low.

Figure 18:
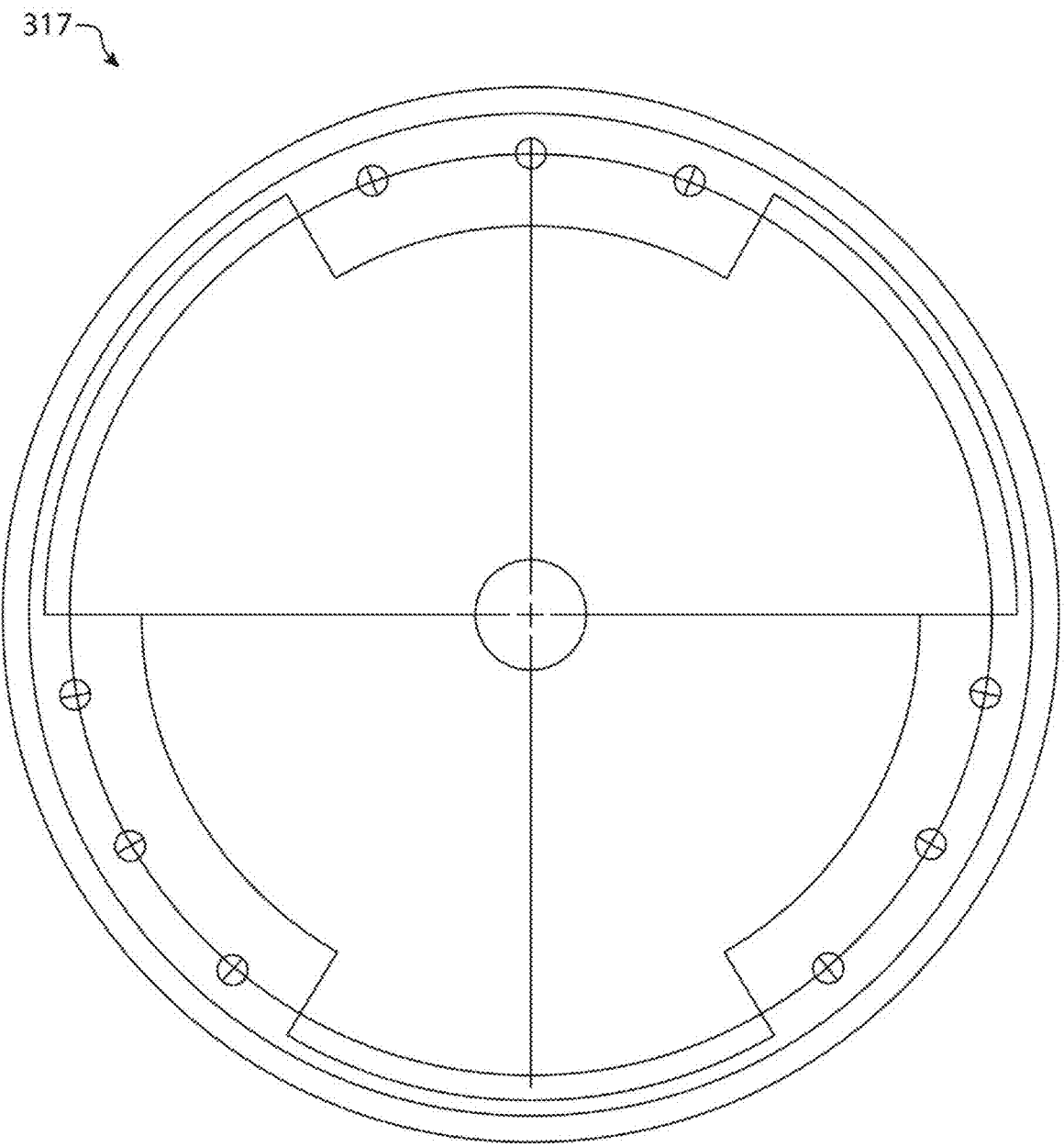
FIG. 18 is a front view of the motor shell of the modified parallel eccentric rotary actuator of FIG. 3.
Figure 19:
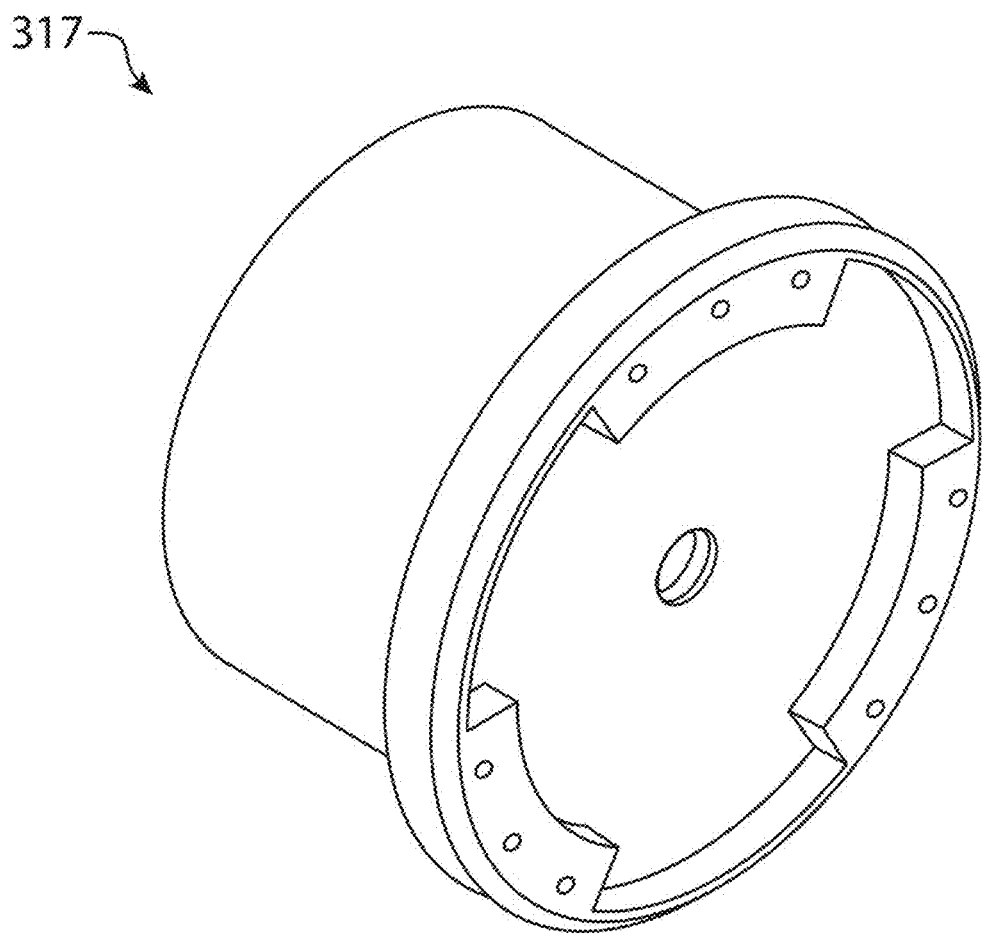
FIG. 19 is a perspective view of the motor shell of the modified parallel eccentric rotary actuator of FIG. 3.
Figure 20:
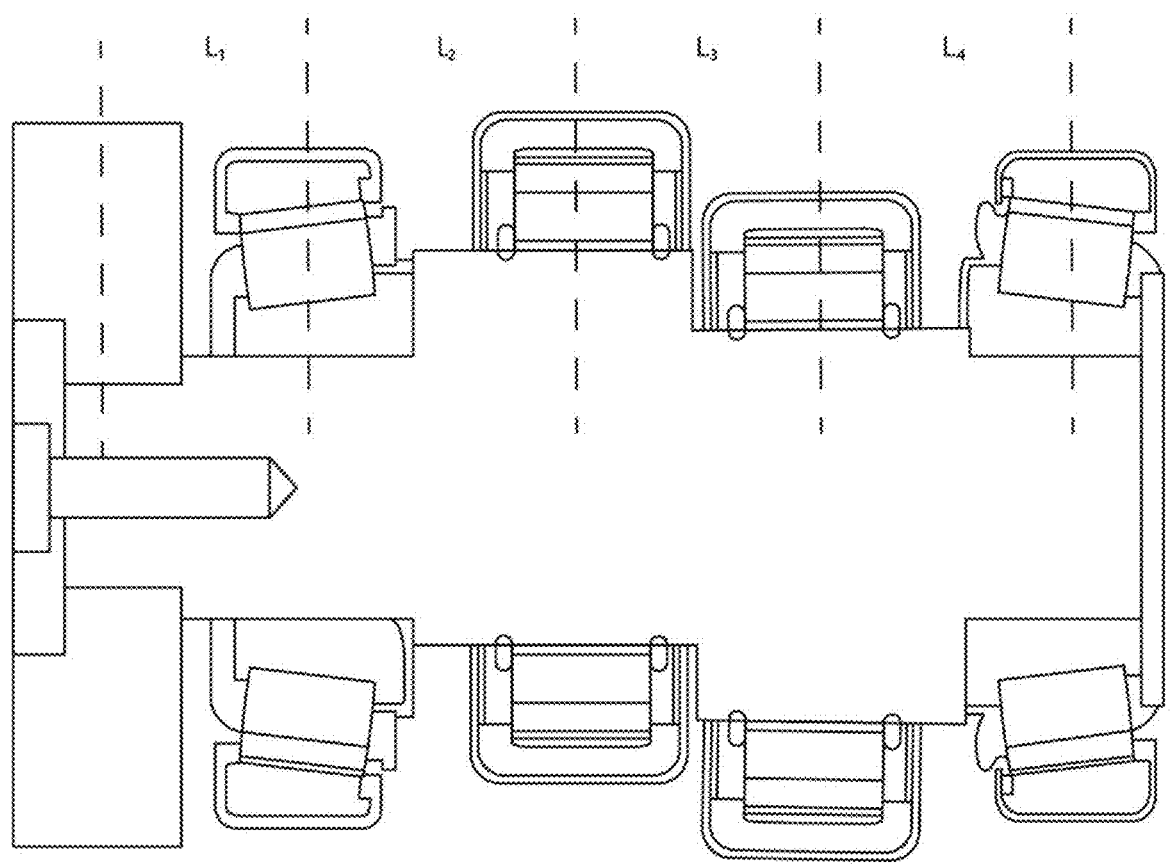
FIG. 20 is an illustration of a loaded/deformed crankshaft in the rotary actuator of FIG. 2.

The MPE can be considered for all scales of actuators from very small to very large. Also, it is not principally dependent on precision if cost is an issue. The circular arc gear teeth could be pressure sintered to enable mass production at lower cost. The cross links could also be pressure sintered, or molded as in a press, etc. The bridges between the cage end-plates could be separate and mass produced with through bolts for their assembly to reduce cost (see FIG. 17). Standard size crankshafts, bearings, ring bearings, etc. could reduce cost. The end-plates could also be simplified and mass produced. This includes a standardized motor shell/gear train interface (FIGS. 18-19). It should be noted that, if the ring is considered stationary, it can be attached directly to the motor shell, requiring only one seal between the now rotating output right cage end plate.

Figure 16:
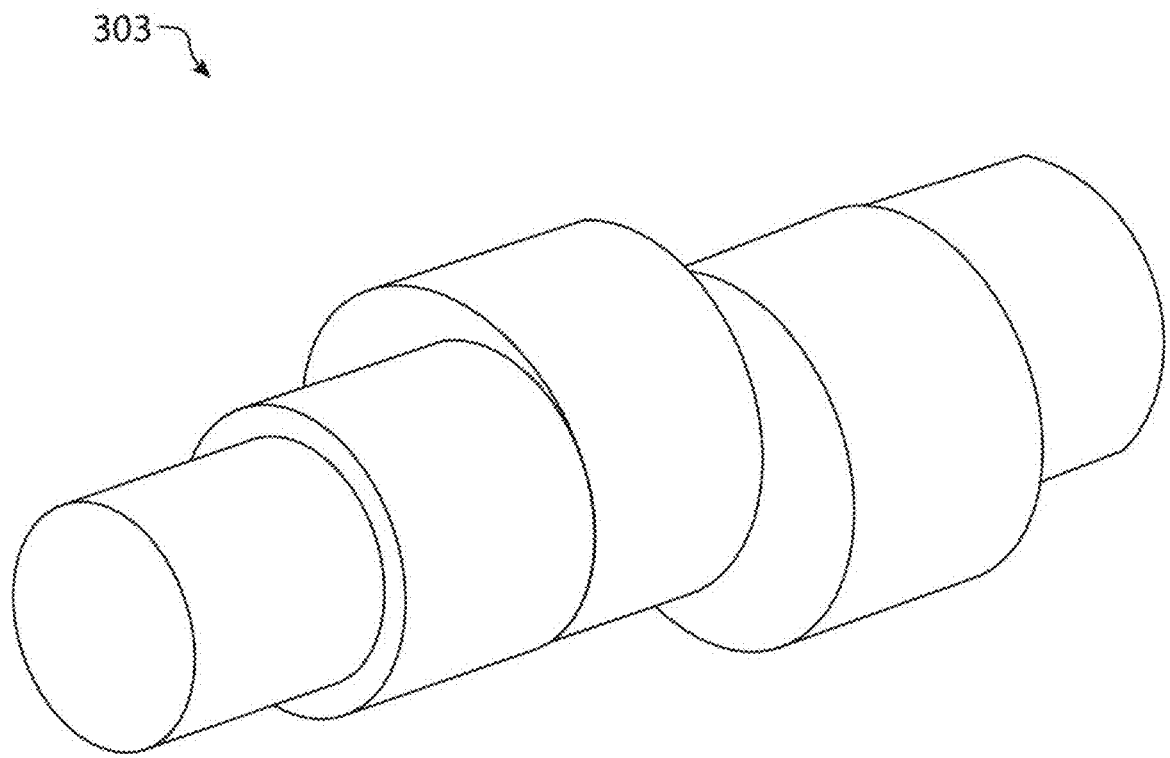
FIG. 16 is a perspective view of the central crankshaft of the modified parallel eccentric rotary actuator of FIG. 3.

FIG. 16 depicts a 3-D view of a preferred embodiment of the central crankshaft. This crankshaft is relatively simple carrying two eccentrics to drive the parallel gears and two end bearings fitted into the cage end plates. One end of the shaft is driven by the prime mover. Also, an eccentric near the prime mover might be used as a pump element in the left cage end plate to pressurize oil for the cross link splines.

It may be possible to use a hollow motor/crankshaft to permit through wiring since so little forces act on the crankshaft. Also, design real estate near the crankshaft is not critical to load capacity/stiffness of the MPE. Cost can be somewhat reduced by not using tapered splines and the associated preload spring (2) between the PE gears. Doing so would permit face to face contact among all the elements (PE gears, cross links, and cage end plates) to reduce any possible tilting of the components—especially the cross links which will have their load forces offset by their thickness and ½ the length of the spline tongues. Also, the tongue and grooves could be inverted in the splines to significantly reduce this load force offset.

Figure 17:
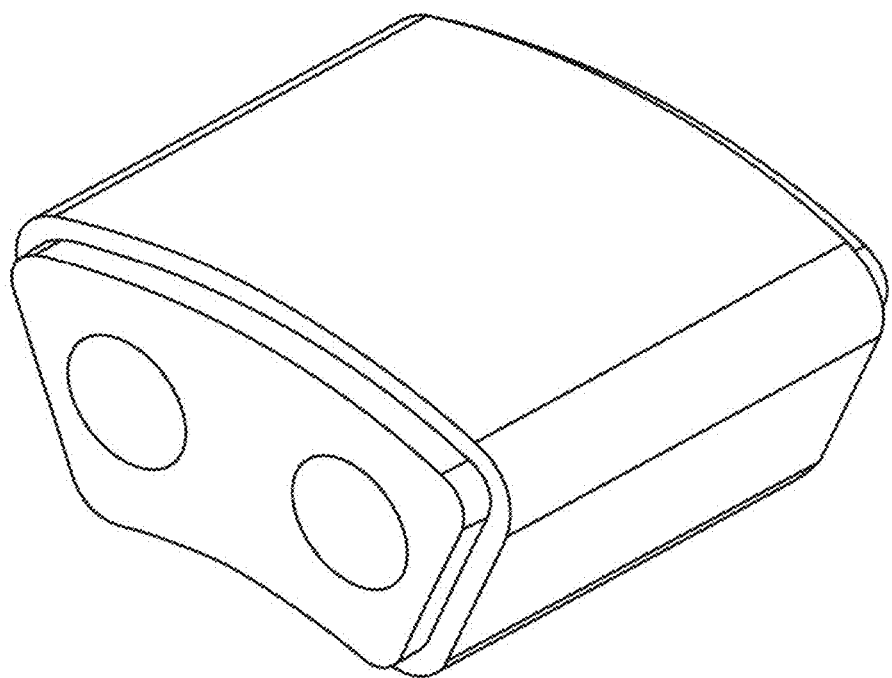
FIG. 17 is a perspective view of a cross bridge for a gear cage in the modified parallel eccentric rotary actuator of FIG. 3.

FIG. 17 is a perspective view of a preferred embodiment of a cross bridge 331 for a gear cage in accordance with the teachings herein. In some cases, the cross bridges would be machined integral to the right cage end plate. To reduce cost, they may be machined separately with machined end bosses to fit into machined sockets in the cage end plates. This bolted assembly would not be quite as stiff as that when the cross bridges are integral.

FIGS. 18-19 depict a preferred embodiment of a motor shell in accordance with the teachings herein. The motor shell has similar properties to most gear train motor attachments. It may or may not have to have a full face if the left gear end plate can adequately support the motor shaft bearing. Weight is typically a consideration, and proportions are quite different for high-speed small diameter or lower speed large diameter prime movers.

I. Pressurized Lubrication

In some embodiments, an oil pump may be incorporated into the design. The parallel eccentric is distinct from the proven Nabtesco gear train (of 100,000-hour durability) in that it uses circular arc gear teeth in the load path instead of "rollers" on cycloidal curves (which are relatively sensitive to curve shape errors, low stiffness, and high lost motion). Nonetheless, both designs can adequately meet lubrication requirements with oil bath splash from the moving internal parts.

Splash lubrication may not be sufficient for heavily loaded modified parallel eccentrics, due to the use of precision splines which do not naturally obtain enough internal surface oil from splash lubrication. Hence, in such applications, it may be advantageous to install a small oil pressure pump on the crankshaft between the gear train and the motor. This pump may drive oil under pressure to the splines from each cage end plate by means of channels in the connecting cage bridges. Each end plate may then channel the oil to its two attached splines. The oil may then be channeled through the cross links to the splines on their opposite sides to lubricate the splines attached to the parallel gears. This type of approach has been used successfully in internal combustion engines to lubricate journal bearings and other sliding surfaces.

Figure 26:
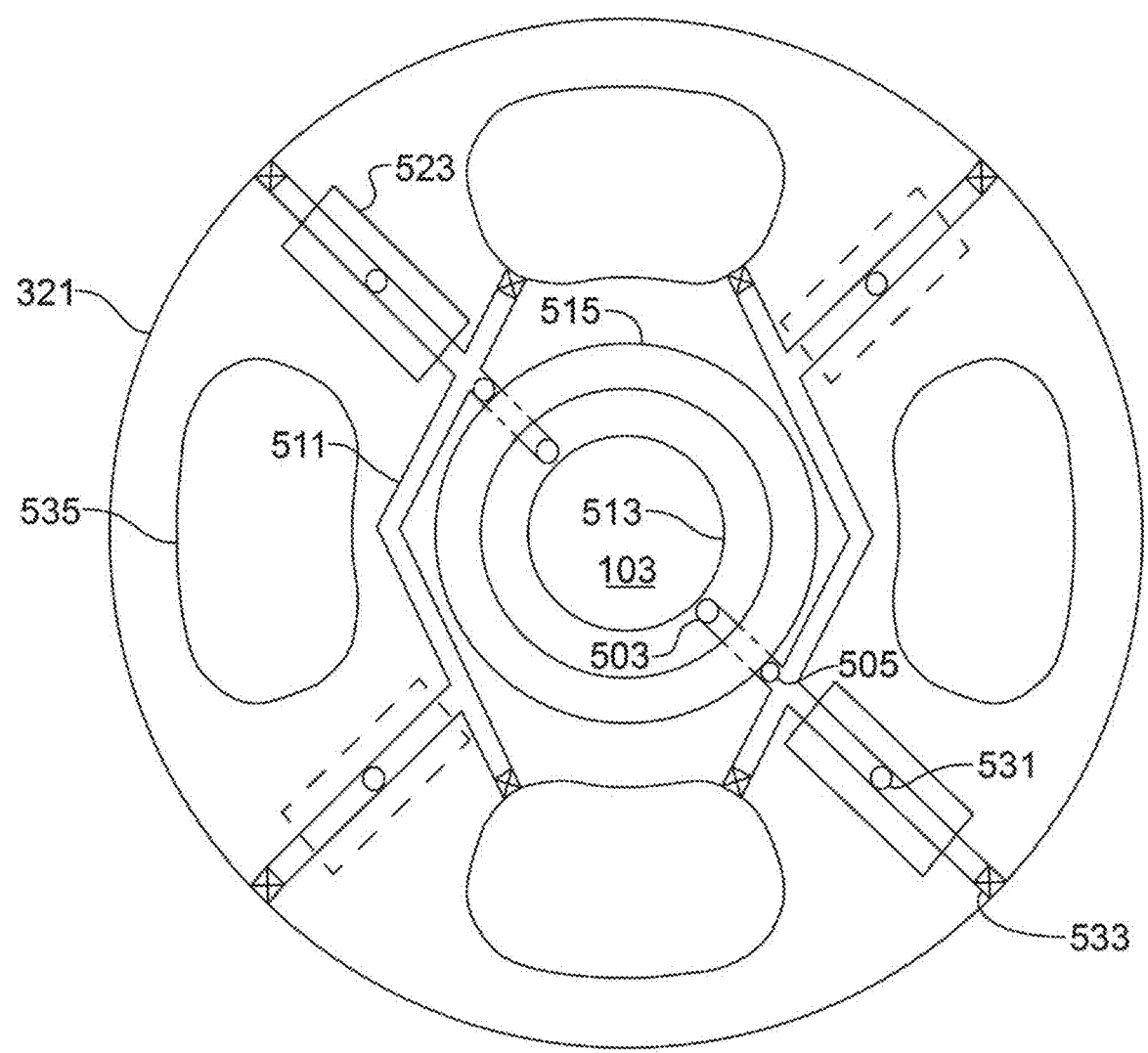
FIG. 26 is a front view of a crankshaft journal oil pump which utilizes 2e oscillation of the cross links to pump oil through oil channels to the splines.
Figure 27:
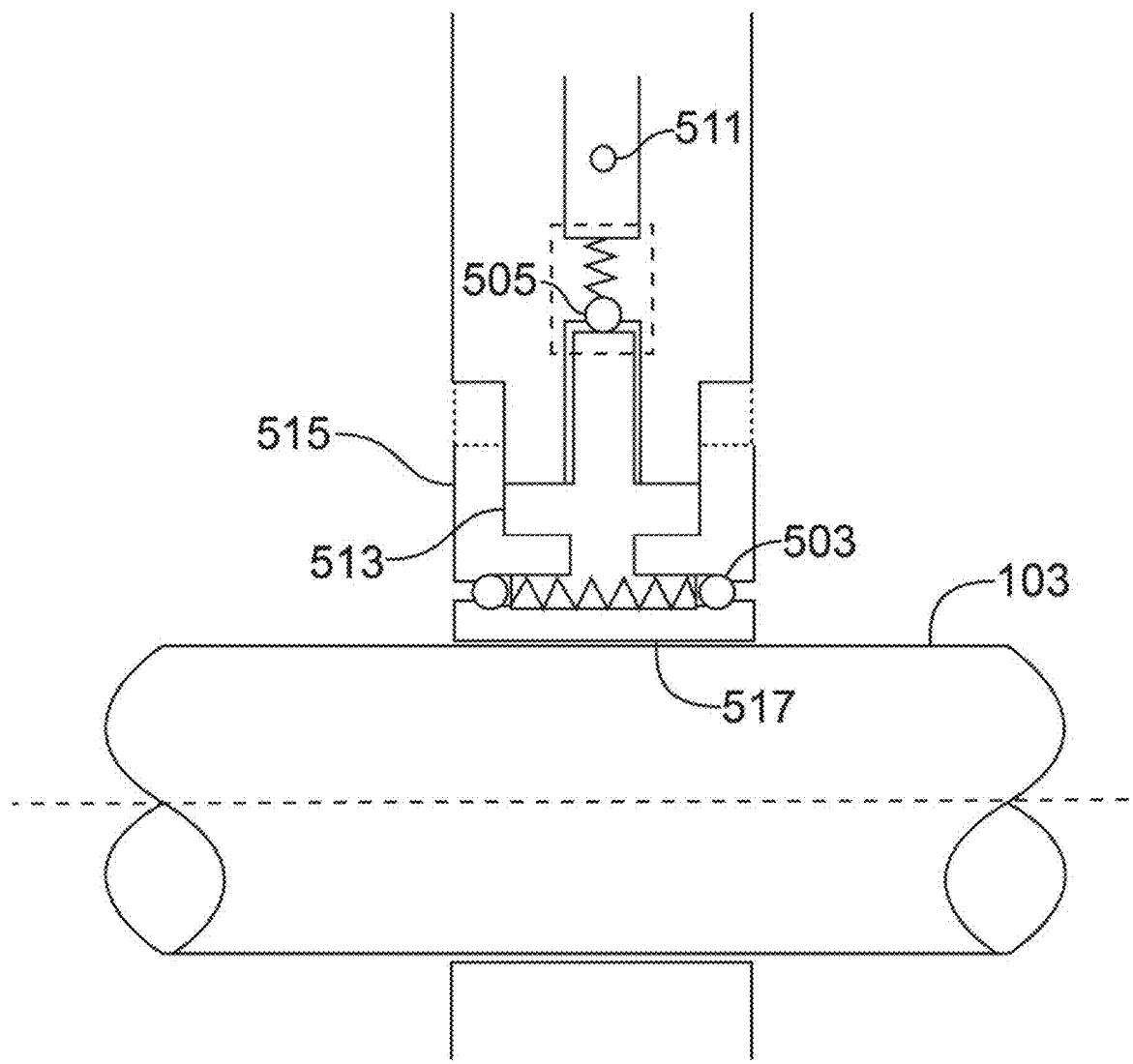
FIG. 27 is a cross-sectional illustration of the journal oil pump of FIG. 26.

FIGS. 26-27 depict a particular, non-limiting embodiment of an alternative means for achieving pressurized lubrication in a cross-link 321 equipped with bridge openings 535. The device depicted utilizes an oblong opening (two half circles separated by 2e; see FIG. 27) in the cross link 321 to act as a mechanical pump (one on each end of the oblong) by using a half crescent moon opening 513 as an oil pressurizing chamber. An inlet ball valve 503 and an outlet check valve 505 may trap and release the oil under pressure for each rotation of the crankshaft 103 (linear translation of the cross links). Each dual pump may supply oil to two neighboring splines 523 by way of an oil channel 511 equipped with a spline oil port 531 and a plug 533. Note that the pump body is splined to the cross link 321 to prevent its rotation and the pump collar 515 rides on a simple journal bearing 517 on the rotating crankshaft 103. It is to be noted that there are numerous choices for lubrication of the MPE depending on its duty cycle and torque density. For example, the zero rotation and small component oscillation means there is virtually no windage or oil churning losses, making it possible to flood a large percentage of the internal volume for complete contact surface coverage. The pump collar 215 in FIG. 27 may be used to spray oil on all contacting surfaces without the use of valved pressurization. Since the crankshaft bearings are very lightly loaded, their lubrication by flooding is sufficient. It is likely that the high speed prime mover will require light bearing lubrication with a seal between the motor and the gear train.

Alternatively, pressurized lubrication may be achieved by embedding linear diaphragm oil pumps in each crosslink 321, where the pump is driven by the linear closing motion between the crosslink and the spinning crankshaft. This motion would be a stroke of about h=0.2 inches. It would drive a small diameter (say ¼ inches) diaphragm to open an inlet valve 503 to bring oil into the pumping cavity. A spring or diaphragm would store energy for the opening stroke. The closing stroke would be forced by the motion of the crosslink 321 towards the crankshaft 103 to drive the trapped oil (the inlet valve 503 would close) on through a detent ball valve 505 to channels 511 to direct the oil to each of the load splines 523. The spring loaded detent ball valve 505 would close (when the diaphragm starts the suction stroke) to maintain pressure in the oil supply channels 511. This whole unit would be cylindrical and be assembled with a threaded joint in the crosslink 321 with a plunger tappet (shaped to match the crankshaft 103) in spring contact with the crankshaft 103.

J. Generalized Splines

The MPE uses the high load capacity circular arc gear teeth and the high stiffness spline in the load path between the output ring gear and the reference gear cage. The circular arc gear teeth have been studied extensively although further study is warranted (i.e., a parametric design process based on their interference curve due to load, deformation, tolerances, etc.). By contrast, the equally important cross link/splines must not be taken for granted. In general, as suggested in FIG. 3, the tongue/groove spline may be thought of as straight sided, parallel or tapered, and dual (in two sections) on each side of the cross-link. The faces of the tongue and groove may have a narrow or wide taper. These faces could be involute in shape with a small pressure angle or parametrically matched concave/convex circular arcs. The base of the tongue should use a root arc to reduce stress concentration. A higher tongue depth would result in more bending but more available contact area for lower contact and lubricant stresses. In particular, the length of the tongue l might be d/5 where d is the diameter of the parallel eccentric gears.

Finally, it is possible to have multiple tongue/groove meshes for each spline. For example, two tongue/grooves could exist in parallel with thinner tongues or 3 could exist in parallel (FIG. 10 a, b). The exact geometry would depend on in-depth finite element analysis confirmed by experiment with the objective of further increasing load capacity by 2×. The first goal is to double or triple the spline contact area that is under load while improving load distribution and spline stiffness. It is conceivable that several special geometry tongue/groove combinations could provide a highly distributed contact mesh. It would be particularly useful at small scales if this physical geometry could be chemically machined or at larger scales, formed and machined in a forging process. Reduced effective contact pressure would improve lubrication and reduce wear. Generally, it is believed that a cost benefit trade will be necessary to best match the application requirements.

K. Roller Splines

As suggested in FIG. 11c, it is possible to consider rollers in the space between the tongue and the groove faces in the load carrying splines. The torque on these splines is T/2 where T represents the gear train design torque. Each spline is made up of two dual splines with a load force ($T_s r_s$=T/4) where $r_s$ is the load $F_s$ center point moment arm. Given a design torque of 6,000 ft-lb. for the parallel eccentric and a moment arm $r_s$=3.5", then this load contact force would be $F_s$=5,143 lb. Given a caged set of 8 rollers, each ¼" in diameter, would result in a load $F_r$=$F_s$/8, or in this case, 643 $lb_f$.

An ASME paper (Line Contact formation: A Cylinder Between Two Flat Plates, M. R. Hoeprick, H. Zautopolous, J. of *Lubrication Tech.*, January 1981, Vol. 103, pp. 21-25) details the deformation expected for this roller loaded on both sides by $F_r$. It is interesting to note that this deformation is independent of the diameter d of the roller. FIG. 2 in the quoted paper gives the total deformation as 0.00054 in/1000 $lb_f$. In this case, the roller deformation $\delta_r$ would be:

$$\delta_r = 0.643 \times 0.00042 = 0.000267 \text{ in.}$$

The contact width 2b can be obtained from $\delta_r$ as:

$$\emptyset = \cos^{-1}\left\{\frac{r_d - \delta_r/2}{r_d}\right\}$$

$$b = r_d \sin\emptyset$$

where, in this case, $\emptyset$=2.65° and then $$b = 0.125 \times \sin 2.67° = 0.0058 \text{ in.}$$

Given a roller length l=0.4 and a width of 2b, then the contact area is $$A = 2bl = 0.00466 \text{ in}$$

Then, from the Hertz stress formulation, the peak contact stress is:

$$\sigma_c = \frac{2 \times F}{\pi b l} = 176{,}500 \text{ psi}$$

This peak contact stress by the Hertz formula is given to be 260,000 psi. For vacuum processed steels, Zaratsky (1992) suggests that the stress could to go 500,000 psi for a life of $10^9$ cycles, which is necessary for this gear train roller splines to operate at a maximum of 10,000 RPM for 6,000 hours. This would, then, allow a design torque of 12,000 ft-lb., or twice that of the prototypical PE.

To get a rough estimate of the deformation level, we consider the effective deformation at 60" as:

$$\delta_{60} = 2 \times \frac{60}{3.5} \times 0.000420 = 0.0144 \text{ in.}$$

Now, compare this with the deformation at 60" of the gear teeth which was 0.0063". Hence, the spline is 2.3× more compliant than the gear teeth. Recall that the PE crankshaft bearings represented a deformation at 60" of 0.043 in. or 3.0× more than these roller splines and 7× that of the gear teeth. This confirms that going to the MPE with roller splines vs. the PE with crankshaft bearings is warranted by this increased stiffness, but also by almost doubling of the gear train's load capacity. This result now makes the circular arc gear teeth essential for the most effective gear train design (the MPE) where in the PE, the benefit was masked by the high compliance (7×) of the crankshaft bearings. Note also, that these roller splines can be passively preloaded to completely eliminate backlash and greatly reduce lost motion.

III. Comparison of Involute and Circular Arc Gear Teeth in Hypocyclic Gearing

A. Objective

The choice of gear teeth is an important consideration for the MPEs disclosed herein. In particular, it is useful to compare involute gear teeth operation relative to circular arc gear teeth in hypocyclic gear meshes where the external gear may have 1 to 3 teeth less than the meshing internal gear where the number of teeth N may be 100. As shown below, for hypocyclic gearing, involute gear teeth with pressure angles of 20 to 25° do not compare well geometrically, in contact stresses, or in bending stresses with circular arc teeth with a pressure angle of 7°.

B. Background

Involute gear teeth became widely used about 150 years ago. To function geometrically, they must use a 20 to 25° pressure angle (creating a 30 to 40% separating force at the gear shaft bearings) to permit the tooth mesh without interference and a contact ratio greater than 1 and usually less than 1.4. This reality works for external spur gears. The contact ratio may go up to 2.0 when a smaller pinion gear meshes with a larger (say, 4 times) diameter internal gear. In any case, most involute gear meshes have only one tooth pair carrying the load for short periods. Using helical teeth improves this condition to more than two, which also reduces tooth load transfer "shock" and therefore reduces noise generation. Looking carefully at involute tooth geometry for hypocyclic motion, generally, the tooth difference has to be 3 or greater to permit useful tooth lengths and meet tooth mesh interference criteria.

On the other hand, extensive geometric studies of circular arc gear teeth (7° pressure angle), shows that a tooth difference of one is possible, greatly increasing the reduction ratio range (3×) of the involute tooth mesh (say, from 30-to-1 up to 100-to-1). The separation forces are now below 10%. Also, when fully loaded, as many as 5 teeth will carry the load where the central tooth carries only 40% (instead of 100%) of the load typical for involute gear teeth.

In describing circular arc gear teeth, Wildhaber (1923, 1926) never considered them to be used in hypocyclic motion. He and others wanted the teeth to be conformal (i.e., the convex and concave radii were to be the same), which would require exceptional maintenance of tooth tolerances (pressure angle, clearances, tooth spacing) and gear center line spacing. Wildhaber and others were then willing to have circular arcs of different radii (say, 2×) to enable more flexibility in design and less sensitivity to the above mentioned errors. The real problem, however, of using circular arc gear teeth spur gears (both of which are external) is that the effective tooth contact ratio is always less than one while the circular arcs are in contact, which means that other less attractive parts of the gear tooth have to carry the load, resulting in high local contact stresses, noise, wear, etc.

C. Recommendations for Use of Circular Arc Gear Teeth for Hypocyclic Motion

Several recommendations may be made for the use of circular arc gear teeth for hypocyclic motion. The present investigator has studied circular arc gear teeth in hypocyclic motion for 15 years (perhaps ten major reports). A prototype hypocyclic of great simplicity was built where an eccentric driven wobble gear with two external gears meshed with one stationary internal gear and one rotating output internal gear to give a potential for a 70-to-1 up to 5000-to-1 reduction ratio. The first gear mesh is largely insensitive to center distance error. The second, however, must have a perfect match of center distances to prevent a ripple in the output proportional to the error ratio with the size of the eccentric. Nonetheless, this gear train provides the advantages of a high torque density with low cost for non-critical positioning applications.

This eccentric ripple error forced the present investigator to create a parallel eccentric using hypocyclic motion where the gears wobble 180° out of phase without rotation to result in almost no inertia contribution from the parallel gears. This gear train uses compound gears to drive three symmetric double eccentric crankshafts to cause the dual parallel motion. Unfortunately, this requires 12 bearings to support these three crankshafts, which has been shown to cause significant compliance in the resulting gear train (bearing and shaft deflection).

Nonetheless, since the gears do not rotate and they are 180° out of phase, there is no critical center distance. The gear mesh may be thought of as a large gear driving a straight rack where the tooth spacing is quite small (say 100 teeth on the large gear). Then, the gear teeth enter the gear tooth spacing on the rack in a motion perpendicular to the rack with a small rotation in the gear while the tooth is engaged (why the 7 degree pressure angle is feasible). The only clearance issue here is the amount of permissible backlash. This backlash can be virtually zero (using a somewhat compliant gear axle bearing to provide mesh forgiveness) or the backlash will increase when the gear axle separates from the rack. A small change in contact ratio will occur due to this separation. Also, a slight change will occur in the contact interference motion curve, perhaps 5%, if the tooth contact radii are different by 2×. These contact interference curves have been studied by stepping through the mesh and seeing what tolerance, deformation, sliding velocity, and temperature affects are allowable. Thus far, no surprises have occurred. With reference to Table 1, it can be seen that:

1. Up to 5 teeth under normal design load are in contact, reducing the maximum tooth load by 2.5×. This makes the mesh self-protective.
2. Since the teeth are 3× shorter than normal involute teeth, bending stresses go down 5×.
3. Since the teeth have convex-concave contact vs. the convex-convex of involute gear teeth, the contact stresses go down by 2 to 5×.
4. Sliding velocities in hypocyclic motion are 5× less than that for long involute gear teeth, obtaining at least a 2.5× wear benefit.
5. Since the gear teeth are shorter and more are in mesh, then the mesh stiffness goes up by at least 5×.
6. The above easily defended results suggest a load capacity increase of 150 to 300× and an overall benefit of 750 to 1500× over involute gear teeth.

The real issue is the cost of manufacture. While hypocyclic gears can be in a 20/21 tooth mesh with a reduction ratio of 20 to 1. Getting to 100 to 1 requires 100/101 teeth, which may cause a doubling of gear manufacturing cost. Also, special cutting/grinding methods would be required, as recognized in 1926 by Wildhaber.

TABLE 1

Involute vs. Circular Arc Teeth

|  | Compound Gear Mesh External/External | Hypocyclic Gear Mesh Internal/External |
|---|---|---|
| Pressure Angles | 20-25° | 7-10° |
| Separation Forces | 30-40% | 10-15% |
| Contact Ratio | 1-1.4 | 3 to 5 |
| Helical Teeth | 1-2.0 | 4 to 6 |
| Tooth Noise | High | Low |
| External/Ext. Teeth Mesh | Yes | No |
| Internal/Ext. Teeth Mesh | Poor | Excellent |
| Reduction Ratio In One Mesh | 5 to 7 to 1 Ext./Ext. | 150 to 1 Int./Ext. |
| Self-Protective | No | Yes |
| Contact Geometry | Convex-Convex | Convex-Concave |
| Backlash | Essential | Virtually None |
| Lost Motion | Medium/Some | Almost None |
| Tooth Spacing Error | Yes | Yes |
| Axial Separation Error | Error Ripple Insensitive | Error Ripple Sensitive |
| Standardization | High | None |
| Sliding Friction | High | Almost None (5x less) |
| Contact Stresses | High | Low |
| Bending Stresses | High (long teeth) | Low (short teeth) |
| Line of Contact Motion | Along Pressure Angle Relative to Pitch Circle | Perpendicular to Pitch Circular |
| Mesh Stiffness | Low and Varies In Mesh | High & Constant in Mesh; 5x Higher |
| Load Capacity |  | 150 to 300x higher |
| Cost of Manufacture | Low | Medium/Uncertain (see Wildhaber, 1926) |

IV. Deformations in Parallel Eccentric Gear Trains

A. Objective

The accuracy and responsiveness of gear train designs depends at least partially on their overall output stiffness. The following summarizes the stiffness of some components of an in-depth design for a 6,000 ft-lb. prototype parallel eccentric in order to prioritize further development, testing, and manufacture.

B. Background

Gear trains are a dominant component in force-related machine operation in order to accurately maintain position under load (including shock) especially in dexterous machines such as robot manipulators, orthotics for rehabilitation, drives in heavy construction, mining, and agricultural machinery, etc., all of which are ultimately under human command. The past depended heavily on hydraulics which are not responsive and difficult to be made intelligent to contribute effectively in modernization of these systems. Gear trains are certainly necessary to transform the high speed/low torque of rotary electric prime movers into useful force magnitudes of the time frame usually associated with human commands. Unfortunately, gear train designers are trapped in the stagnant designs associated with involute gear teeth (AGMA standards) and epicyclic gear trains (finite reduction ratios, considerable backlash, and relatively low torque density).

The prototype parallel eccentric was built to be the foundation for a revolution in gear train development. Specifically, it was to be a scaled version (6,000 ft-lb. vs. 125,000 ft-lb.) of a submarine water vane actuator with an output speed of 1 RPM with the requirement of being super quiet in the water. This meant that absolutely no backlash and tooth load variation generated noise was acceptable. To achieve this, all velocities had to be quite low and hypocyclic motion with circular arc gear teeth became essential. The load capacity of these gear teeth is quite high. The primary issue becomes the load capacity of the four rolling element bearings on each of the three crankshafts that drive the two oscillating gears. Using high-end tapered roller bearings made it possible for the gear train to be of a reasonable size (see Design of an Electro-mechanical Actuator for Fair Water Vanes in Submarines, D. Tesar, et. al., major report to the Office of Naval Research (ONR) 10108).

C. Overall Actuator Stiffness

Figure 21:
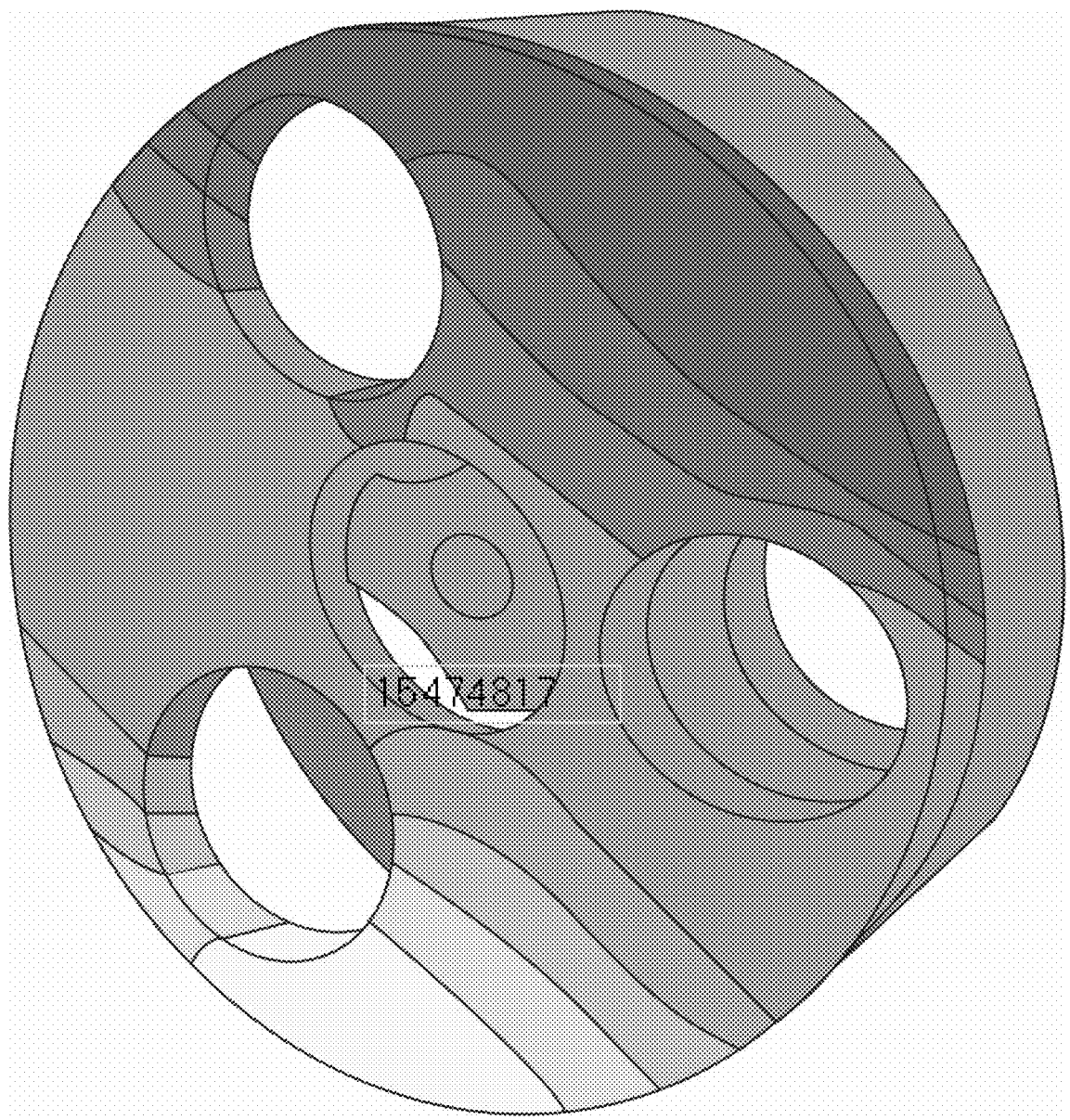
FIG. 21 is a topographical map of FEA cage deflection in the rotary actuator of FIG. 2.
Figure 22:
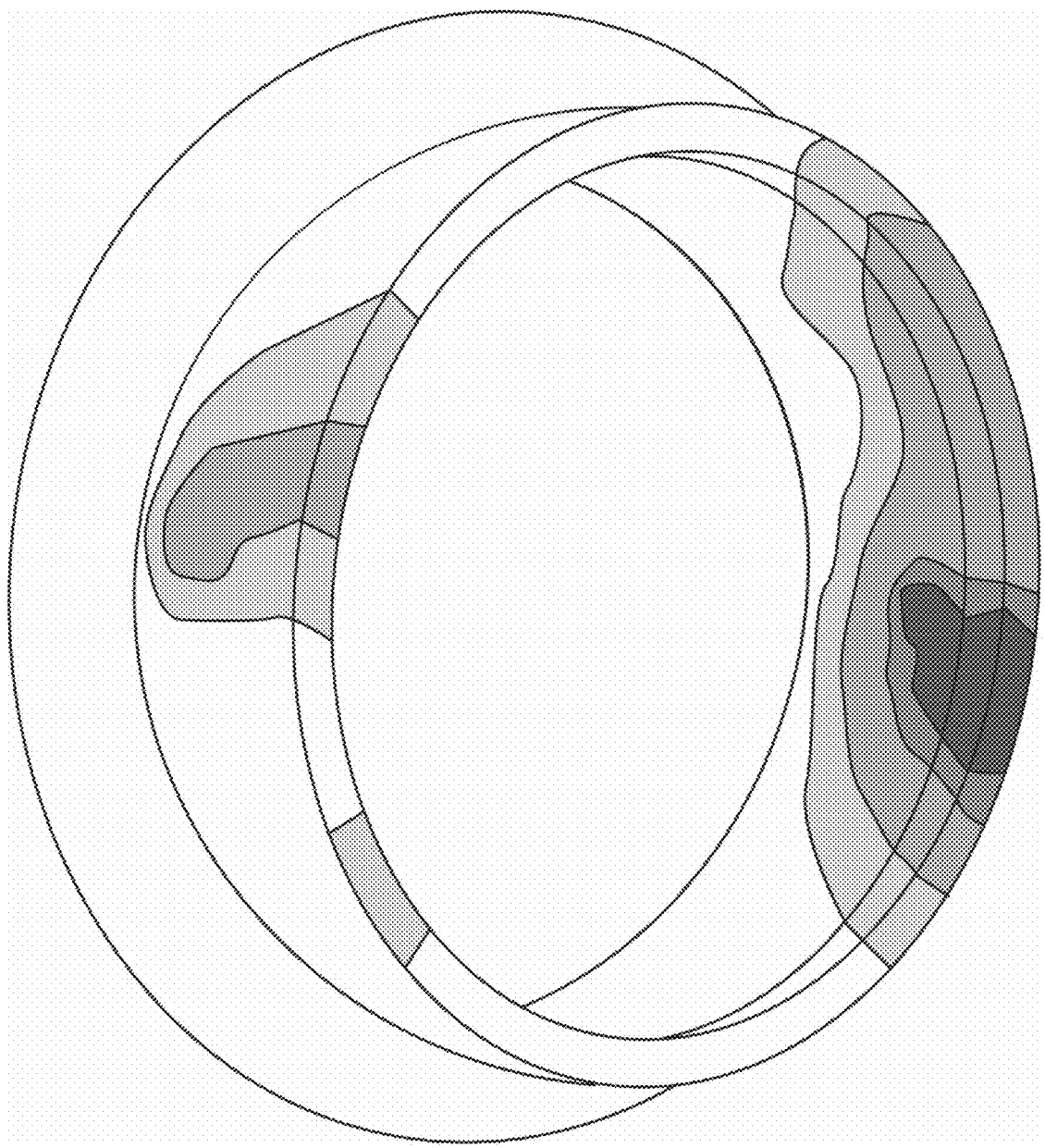
FIG. 22 is a topographical map of FEA gear deflection in the rotary actuator of FIG. 2.

The question then arises, what is the contribution of principal gear train components to the overall rotary stiffness of this actuator? Based on careful FEA analysis of a 6000 ft-lb. PE prototype, the average rotary stiffness is 63,000 ft-lb/deg., which results in a stiffness at 60 inches of 12,000 lb/in. This means that for the 6,000 ft-lb. torque design load, the deformation at 60" is 0.1" which is quite reasonable for a good design. The interesting question is what contributes to the stiffness (or compliance) of the actuator; i.e., angular deformation in degrees/percent. These values are presented in TABLE 2 below. To further illustrate the foregoing, topographical maps of FEA cage and gear deflection in the rotary actuator of FIG. 2 are depicted in FIGS. 21 and 22, respectively.

TABLE 2

Sources of Deformation

| | Deformation | Degree (°) | % |
|---|---|---|---|
| 1 | The gear teeth deform under the tooth load | 0.006 | 6.3 |
| 2 | The bearings between the gears and the driving crankshaft. | 0.021 | 22 |
| 3 | The bearings which support each end of the crankshafts. | 0.022 | 23 |

TABLE 2-continued

Sources of Deformation

| | Deformation | Degree (°) | % |
|---|---|---|---|
| 4 | The bending of the crankshaft as a beam. | 0.007 | 7.4 |
| 5 | The cage structure that holds the system together. | 0.040 | 42 |

Surprisingly, the cage contributes 42% of the gear train compliance. It is to be noted that the additional cage support (not considered in this analysis) by the output principal roller bearings which also supports the outer internal gear would reduce this cage compliance down to a reasonable 20%. Nonetheless, the cage and the crankshaft bearings contribute even then up to 80% of the compliance. This is one of the principal issues for the parallel eccentric if rotary output stiffness is important. Clearly, the gear mesh and the crankshaft are sufficiently stiff. The bearing stiffness might improve if needle bearings were used because of more line contacts and a smaller outer diameter which might enable a stiffer cage. This might double the rotary output stiffness of the gear train to yield a 0.005" deflection at 60" for the design load which may be considered to be quite good. At 10 ft., this would yield a deformation of 0.01" with a load of 600 lb, which suggests a high load capacity and perhaps good resistance to shock overloads as might be found in construction/earth excavation equipment. Overall, the circular arc gear teeth in the parallel eccentric (hypocyclic motion) are able to carry 150× more load than standard involute gear teeth used in compound gearing (i.e., load density). The teeth are very stiff relative to pins on cycloidal curves, but as seen with the above results for the parallel eccentric, their stiffness attributes (5 to 10× better than involutes) are masked by other deformations (primarily due to crankshaft bearings and cage support) in the parallel eccentric gear train (i.e., with high load capacity and smooth outputs, which is sufficient for many applications). The stiffness issue is dealt with in the modified parallel eccentric gear train disclosed herein.

V. Modified Parallel Eccentric (MPE) Gear Train Discussion Points

A. Background

Gear trains are a dominant component in force-related machine operation in order to accurately maintain position under load (including shock) especially in dexterous machines such as robot manipulators, orthotics for rehabilitation, drives in heavy construction, mining, and agricultural machinery, etc., all of which are ultimately under human command. The past depended heavily on hydraulics which is not responsive and difficult to be made intelligent to contribute effectively in modernization of these systems. Gear trains are certainly necessary to transform the high speed/low torque of rotary electric prime movers into useful force magnitudes of the time frame usually associated with human commands. Unfortunately, gear train designers are trapped in the stagnant designs associated with involute gear teeth (AGMA standards) and epicyclic gear trains (finite reduction ratios, considerable backlash, and relatively low torque density). The MPE gear train disclosed herein offers a number of notable advantages over such designs.

B. Uniqueness

The MPE disclosed herein is unique in that it is considerably more torque dense 2×), stiffer 8×), and more versatile than the previous parallel eccentric design which exceeded the overall performance of the proven Nabtesco gear train by 3 orders of magnitude. It is fully scalable in size (miniature for surgery to very large for construction machinery) and in cost of production.

C. Basic Characteristics

In terms of its basic characteristics, the MPE gear train, in the preferred embodiment, will employ circular arc gear teeth on a pair of oscillating (not rotating) parallel external gears meshing with a single output internal gear supported by two parallel widely spaced, large diameter rolling element bearings of small cross-section (probably opposed tapered roller bearings) to create an exceptionally rugged output structure (see FIG. 1). This gear train will be driven by a single central crankshaft with two eccentrics to drive the two parallel gears. These eccentrics will use a pair of high-stiffness needle bearings to drive the gears. Otherwise, there are no other low stiffness, failure prone bearings in the gear train; i.e., the whole gear train contains only six rolling element bearings. Since it is a parallel eccentric, the parallel gears are perfectly balanced dynamically and there is no output ripple since the gear meshes are 180° out of phase and cancel any eccentric error influence on the output motion.

D. Stiffness

The MPE gear train disclosed herein also offers desirable stiffness. The structure will be exceptionally rigid, with much higher output stiffness than that for the Nabtesco. It will not need any front-end gears. It can provide a gear ratio from 30 to 150 to 1 and, using a reverted star compound front-end gear train, can provide ratios from 30 to 1 up to 3000 to 1. By itself, the modified parallel eccentric should be more compact than the Nabtesco or the earlier parallel eccentric by the author, producing more torque in a smaller volume and, therefore, a lower weight. All indications are that the minimum set of 6 bearings will substantially increase durability and reduce cost. Since now only the circular arc gear teeth and the splines resist the load (not also the 12 bearings on the 3 crankshafts), the stiffness of the gear train will be high. In the earlier PE design, the three crankshafts and their bearings represented 45% of its compliance, the cage represented 42% of the compliance, while the crankshaft, itself, represented 7.4% and the circular arc gear teeth were the stiffest at only 6.3% of the compliance.

E. Crosslinks and Splines

The use of crosslinks and splines in the MPE disclosed herein offers numerous advantages. In the preferred embodiment of the MPE disclosed herein, the load goes from the output ring gear through the circular arc gear teeth through the splines and finally to the stationary reference cage end-plates. Hence, the gear teeth and the splines are in the direct load path of the actuator. The basic design principle here is to ensure that the splines are at least equal in load capacity as the functioning circular arc gear teeth, which now must be the best feasible configuration to maximize load capacity, minimize deformation, wear, sliding velocity, noise, etc.

F. Preloading Splines

The use of a tapered spline in some of the embodiments disclosed herein poses the challenge of maintaining contact when the wear occurs over time. This may be achieved by using two linear wave springs (or a circular wave spring) between the PE gears. The springs would create a separating force to move the gears apart on their non-constraining needle bearings. Each PE gear would, then, produce a closing force on all the splines on their neighboring cross links to completely eliminate backlash. Since the circular arc gear teeth have no backlash, and these tapered splines would have no backlash, then the whole gear train would have no backlash. The angle in the taper, the required closing force, the effect on lubrication, etc. would benefit from careful analytical and experimental analysis.

G. Force Balancing

Another advantage of the preferred embodiment of the MPE gear train disclosed herein is that all load and dynamic forces on the PE gears are balanced since they are 180° out of phase. Also, all load and dynamic forces on the cross links are balanced since they are necessarily 180° out-of-phase. The crankshaft bearings that drive the PE gears do need to generate small acceleration forces to cause the small gear oscillations and to generate the low gear teeth closing forces (about 10% of the tooth contact forces). This means that the crankshaft is perfectly load balanced and experiences no bending forces, and its end bearings are unloaded.

H. Non-Critical Bearings

A further advantage of the preferred embodiment of the MPE gear train disclosed herein is that it eliminates the need for bearings as critical components of the gear train. In particular, in the preferred embodiment of the MPE, only two external bearings, and four crankshaft bearings, are present in the gear train, and none of these bearings are in the critical force path of its operation. This is in contrast to the role of the twelve crankshaft bearings in the earlier parallel eccentric gear train design, which are critical to the operation of that gear train. It is preferred that the crankshaft bearings in the cage end plates are relatively compliant to forgive any eccentric shaft offset errors. This passive compensation will occur due to the gear teeth closing forces at the opposing gear meshes (at) 180°, where if one closing force is larger than the other, it will automatically re-center the crankshaft offset.

I. MPE Versatility

The preferred embodiment of the MPE disclosed herein also offers significant design versatility. In particular, the number of gear teeth on a PE gear is of central concern to its design. For 30 teeth (one tooth step per revolution), a 30-to-1 reduction ratio is possible. Similarly, with 100 teeth (and a 3-tooth step per revolution), a 33-to-1 reduction is possible. Both designs result in a larger eccentric and, therefore, larger gear oscillation and longer spline motions which in critical applications may be undesirable. It is feasible to use up to 150 teeth and obtain a 150-to-1 reduction ratio with a one-tooth step for each revolution. This then provides a ratio range of 30 to 150-to-1. Then, using a reverted star compound gear frontend of up to 20-to-1 reduction, the useful reduction ratio range may be expanded to 30 up to 3000-to-1.

Here, it is to be noted that the foregoing arrangement features a very light, high speed, low inertia front end with a very rugged, high stiffness, low speed and high load capacity backend to create a very versatile gear train for a very wide range of applications. Also, the inertia content of this combination has now become extremely low. Even though the frontend may be at 10,000 RPM, the MPE, itself, may be at 500 RPM. In the preferred embodiment, the internal inertia forces on the crankshaft bearings and on the splines now are not only completely balanced, they are also very low.

J. MPE Scalability

The MPE gear train disclosed herein also offers advantages in terms of its scalability. The MPE may be considered for all scales of actuators from very small to very large. Also, it is not principally dependent on precision if cost is an issue. The circular arc gear teeth may be pressure sintered to enable mass production at lower cost. The cross links may also be pressure sintered, or molded as in a press, etc. The bridges between the cage end-plates may be separate and mass produced with through bolts for their assembly to reduce cost. Standard size crankshafts, bearings, ring bearings, etc. may be utilized to reduce cost. The end-plates may also be simplified and mass produced.

K. Spline Lubrication

In some embodiments of the MPE disclosed herein, the precision splines utilized may not naturally obtain enough internal surface oil from splash lubrication. In such embodiments, a small oil pressure pump may be installed on the crankshaft between the gear train and the motor. This pump would drive the oil under pressure to the splines from each cage end plate by means of channels in the connecting cage bridges. Then, each end plate would channel the oil to its two attached splines. This oil would, then, be channeled through the cross-links to the splines on their opposite sides to lubricate the splines attached to the parallel gears. This type of approach has found success in internal combustion engines to lubricate journal bearings and other sliding surfaces.

L. Tabulation of Gear Teeth Properties

As previously noted, the MPE gear trains disclosed herein preferably utilize circular arc gear teeth. TABLE 1 lists 22 distinct properties/features of circular arc gear teeth when used in hypocyclic motion relative to involute gear teeth when used in compound external gear pairs. These properties and features underscore the revolutionary nature of circular arc gear teeth in this application.

M. MPE/PE Comparison

The advantages of the MPE gear train disclosed herein may be further appreciated with respect to TABLE 3, which lists 15 distinct comparisons between the previous parallel eccentric (PE) gear train and this updated modified parallel eccentric (MPE). As seen therein, the MPE excels, especially if the required spline precision can be obtained at reasonable expense and if spline wear can be managed through pressurized lubrication or the use of roller splines.

TABLE 3

MPE/PE Design Comparison

| | PE | MPE |
|---|---|---|
| Stiffness | Average | High |
| Complexity | Average but Proven | Medium |
| Critical Rolling Element Bearings | 12 | None |
| Cross Link Splines | None | 8 |
| Shortest Force Path | Partially | Yes |
| Cancel Ripple Error | Yes | Yes |
| Front End Spur Gears | Necessary | None Required |
| Front End Reducer Possible | Yes | Yes |
| Number of Crankshafts | 3 | 1 |
| Oil Pressure Pump Needed | Perhaps | Perhaps |
| Dynamically Balanced | Yes | Yes |
| Compactness | Good | Excellent |
| Stiffness | Medium | Very High |
| Bearing Deformation | High | Very Low |
| Crankshaft Deformation | Low | Almost None |
| Design Priorities | Crankshaft & Bearings (teeth are far less critical) | Teeth & Roller Splines |

N. MPE Design

TABLE 4 lists 9 priorities for initial MPE design prioritization. As seen therein, the first priority is to ensure that the circular arc gear teeth are the governing element in the gear train. After that, it is very desirable that the parametric influence of the splines are nominally equal for good design, primarily because the teeth fix the primary properties of the gear train. Roller splines result in an approximately 1.9× more deformation than that in the gear meshes.

TABLE 4

MPE Design Priorities

| | Gear Teeth | Splines |
|---|---|---|
| Lubrication | Good | Uncertain (splash or pressurized) |
| Stiffness | 1 | 50% |
| Load Capacity | 1 | 1 |
| Tolerancing | Important | Uncertain |
| Backlash | Preload with Crankshaft Bearings | Preload with Spring Between Parallel Gears |
| In Load Path | Yes, at Tooth Radius r | Yes, at Radius 2/3 r |
| Surface Treatment | High | High |
| Maximum Contact Stress | 200,000 psi (plus) | 200,000 psi (rollers) |
| Sliding Velocity | Low | Low |

With reference to the devices 401, 421 of FIG. 24, multiple parallel splines 403, 423 may be used to distribute the load torque among several contacting surfaces to reduce contact pressure, reduce wear and improve durability. Of course, the cost of manufacture may increase somewhat. The device 441 of FIG. 24c shows that rollers 445 can be inserted between the contacting surfaces to reduce friction and virtually eliminate wear, with some additional cost but no backlash (if preloaded). Further, it is noted that multiple spline needle rollers in a cage can carry considerable load at a high level of stiffness.

VI. Spinea Twin Spin Gear Train

A. General Description

Surprisingly, a very innovative gear train has been developed in central Slovakia (Kosice) based on the same kinematics used in the Modified Parallel Eccentric (MPE). This gear train (FIG. 11) uses only one central crankshaft to drive a pair of non-rotating eccentric gears (180° out of phase) to drive an output internal ring gear as is done in the Nabtesco, the PE, and the MPE. The Nabtesco and the Spinea Twin Spin both use cycloidal curve "gearing" to mesh with a finite number of circular pins (needles) that are embedded in the output ring casing. These "needles" must be located in precision circular grooves in the casing in order to not result in any free motion (backlash). This means that they are effectively fixed in the casing and do not rotate, which results in considerable surface sliding at high levels of contact force, which, then, creates considerable friction and loss in efficiency (FIG. 11).

The parallel eccentric gears in the Spinea design are prevented from rotation by using cross link/spline principles similar to those utilized in the MPE, thus demonstrating this concept's usefulness. There are two cross links to mesh with the two eccentric gears and their neighboring left and right end plates. Here, the "splines" are represented by parallel bosses (grooves) and cantilevered arms (tongues) on the cross links. The tongues carry a finite number of rollers to reduce friction, as represented by the suggested roller splines in the MPE.

The gear cage is formed with bridges between the end plates fastened with through bolts. For the Twin Spin, the case is held stationary while the cage rotates as output. The cage end plates ride on large diameter bearings of small cross section with every other roller designed for radial loads and the others for axial loads (which replaces the concept of tapered roller bearings in the MPE). The central crankshaft carries rather large caged roller bearings to drive the eccentric gears. The crankshaft is anchored in each end plate with cage rollers running on precision machined surfaces on the crankshaft and in the end plates. Since the ring 'gear" is stationary, it can be bolted to the motor case, making a moving seal at that location unnecessary (this is also possible for the MPE). This results in the need for only one large diameter moving seal between the ring gear and the right end plate.

An example Spinea gear train is their TS300 which carries a load of 4,065 ft-lbf with a stiffness of 4,742 ft-lbf/arc min. Its dimensions are 5.5" by 11.8" and its weight is 123 lbf with lost motion of 1 arc min. This means that its torque density is given as 33 ft-lbf/lbf. It is designed for 6,000 hours at a full duty cycle and is able to carry considerable out-of-plane moment to be able to function as a generalized machine joint. The efficiency charts for this TS class shows a maximum efficiency of 90% at full load and full speed (3000 RPM) but 80% at half load and dropping to 70% at 25% load.

B. Cycloidal Wave Gear

The primary non-rotating parallel eccentric gears contain on their periphery a cycloidal wave to drive the pin needles in the output ring gear. This cycloid/pin mesh is deceptively simple in appearance. In the center of the mesh, the pin rides on the bottom of the cycloid wave, such that it cannot create any driving force to contribute to the desired output torque. The driving force is created either to the left or to the right of the mesh center, perhaps two pins away. This driving force $F_t$ is tangent to the gear pitch circle, but the contact force Fc is created with an effective pressure angle estimated to be 45°, which means that $F_c=1.4F_t$, a 40% increase in the sliding friction force and a 100% closing force Fcl=Ft which acts on the crankshaft bearings requiring them to be rather large. By contrast, the MPE uses circular arc gear teeth with a 7° pressure angle, where $F_c=1.1\ F_t$ and the teeth closing force acting on the crankshaft is only 10% of $F_t$.

C. Contact Force Impact

The essential driving force $F_t$ is increased by 40% in a high surface contact force $F_c$. This larger $F_c$ creates higher contact stresses reducing load capacity by 40%. Further, this larger $F_c$ force results in 40% larger contact deformations which are amplified by the pressure angle another 40% to create an effective increase in the mesh compliance of 80%, thus significantly reducing the gear train's stiffness (perhaps ~2×).

D. Pin Sliding Motion

The pins in the outer ring gear must fit tightly in circular grooves to reduce potential for backlash. This means that these pins do not rotate freely in their circular sockets. These pins must deal with the 40% increase in contact force due to the 45° pressure angle. Since the pins do not rotate the mesh experiences pure sliding between the gear cycloid wave and the pin. Further, this sliding force $\mu F_c$ is 40% larger because of the 45° pressure angle. All of this leads to a high resisting friction torque which results in efficiencies never better than 90% and usually at 80%, or less. This friction reality is confirmed by the sensitivity of this type of cycloidal mesh to lubricant or grease viscosity.

For the MPE, circular arc gear teeth with a 7° pressure angle carry a contact force Fc=Ft with virtually no sliding velocity so that friction losses will be very low (perhaps 5×) relative to that in the cycloidal/pin mesh of the Nabtesco and Twin Spin gear trains.

E. Cross Link Design in the Twin Spin

The use of the Oldham kinematic constraint in the Twin Spin to prevent the rotation of the parallel oscillating gears is correct and is the same constraint used in the MPE. The physical reality is quite different. In the Twin Spin, the tongues are cantilevers as extensions from a rather weak inner rim, resulting in some undesired compliance. Moreover, the grooves are face boss extensions of their neighboring end plates or parallel gears resulting in a longer gear train (than in the MPE). Finally, rollers are utilized to reduce friction between the tongues and the grooves, which is very desirable. These rollers could likely be crowned to reduce the probable effects of misalignment due to larger moment arm in the larger axial offsets in the cross link geometries.

An elementary cantilever bending analysis of the Twin Spin spline/tongue indicates an equivalent deformation of 0.1" at 60", which is 15× higher than that expected for the circular arc gear teeth in the MPE.

F. Crankshaft Bearings

These bearings must resist a static load equal to the driving force Ft due to the 45° pressure angle of the cycloidal gear mesh. This, plus inertia forces, requires large crankshaft bearings using up considerable space inside the gear train, therefore, increasing its diameter and its overall weight. Further, these heavily loaded bearings add compliance which reduces the quality of the gear mesh and reduces the overall stiffness of the gear train. This is also true of the Nabtesco design. By contrast, the MPE has only a 10% load from the driving force acting of the crankshaft bearings.

The Twin Spin and the Nabtesco have three major sources of compliance: (1) crankshaft bearings, (2) mesh compliance, and (3) cross link compliance with multiple force pathways. By contrast, the MPE has a very simple load path from the gear teeth through the splines to the output gear cage, bypassing the crankshaft bearings, substantially increasing stiffness and load capacity.

G. Lost Motion

This concept is widely accepted to be the motion at the output that results in a +/−load of 3% of the design load. In this case, the cycloidal/pin mesh is very susceptible to this lost motion because there is no tangential force load capacity in the center of the mesh. The force must transfer downstream from the center of the mesh to a wave (perhaps three waves) to create a contact force of magnitude usually at a pressure angle of 45°. Reversing this load direction forces a buildup of force on the other side of the mesh center. This reverse of force occurs with very little resisting force in the mesh and, therefore, a high level of compliance and a large lost motion. In fact, both Nabtesco and Twin Spin quote lost motions of 1 arc min. which amounts to motion of 0.1 in. at a 60 inch moment arm. The MPE should have perhaps 4× less lost motion because of the stiffness of the cross links, the roller splines, and the circular arc gear teeth, especially if these are preloaded.

H. Gear Train Accuracy

Twin Spin publishes in their trade literature an accuracy plot with a range of 25 arc seconds. Half of this error is due to pin/cycloidal curve spacing errors and half is due to the twice per cycle geometric oscillation errors of the eccentric parallel gears. Neither of these errors can be eliminated. They are closely associated with the cost of manufacture (as in tooth spacing tolerances in different spur gear quality under AGMA standards). The large pressure angle of 45° suggests a greater wear sensitivity because of a multiplying effect of approximately 2×. In the MPE, the 7° pressure angle significantly reduces this sensitivity. The measured accuracy plot shows that cost-effective manufacture is feasible for the MPE as well.

I. Overall Stiffness

The Twin Spin TS300 specification shows a stiffness of 921 ft-lbf/arc min, which results in a deformation at 60" of 0.114" for a load of 1000 ft.-lb. The MPE circular arc teeth mesh yields a deformation of 0.001" for 1000 ft-lb and for the roller splines the deformation is 0.002" to give a total deformation of 0.003" or about 40× greater stiffness than the Spinea TS300. Of course, the gear cage contributes to the MPE's compliance at 0.007" and the cross links are expected to contribute about 0.003", to give a total deformation of 0.013" for 1000 ft-lb torque. This would then result in a stiffness of roughly 8000 ft-lb/arc min, which is very high and ~9× that of the TS300.

J. Efficiency

The efficiency of a gear train is heavily dependent on the high contact force Fc, and contact sliding velocity $v_f$ because of the energy losses due to $\mu F_c V_f$. In this regard, rolling elements generate very little loss due to rolling contacts (less than 1%). The cycloidal/pin gear mesh moves at high speed around the periphery of the gears. For example, a 1000 ft-lb. torque at 10 RPM output represents 1.9 hp. Given a loss of 10% at full speed means a 0.19 hp loss. At half speed means the loss may be (as reported in the trade literature) 20% which operates at 0.95 hp also yields a 0.19 hp loss.

It now becomes useful to estimate energy loss at the mesh for both the MPE circular arc tooth mesh and the Spinea/Nabtesco cycloidal/pin tooth mesh (assuming that the pin does not rotate). The reference torque would be 6,000 ft-lb. at 10 RPM output speed which represents 11.42 hp. For the MPE, the contact force $F_c=F_t$ would be 7,200 $lb_f$ for each of two meshes.

We consider the max sliding velocity $v_f$ to occur approximately one tooth ahead of the center of the mesh or 3.6° for a 100 tooth mesh. The velocity would be generated by a 0.1" eccentric at a linear velocity of $v_e$=62.8 in/sec. The sliding velocity $v_f=v_e$ sin 3.6°=3.94 in/sec, with a coefficient of friction of $\mu$=0.02; this yields a loss of 0.072 hp which at 1.5% is a relatively low loss. Here, it is to be noted that the contact force one tooth ahead of the center of the mesh can easily be 40% of the full contact force on the central tooth which would reduce this predicted loss to 0.6%, which compares very favorably with normal losses for involute gear teeth in compound gear meshes (~0.5% to 1%). Also, relative to documented Spinea and Nabtesco losses, the MPE losses then would be 10× less.

For the cycloidal/pin mesh, we consider the contact force of $F_c$=10, 180 $lb_f$ for each of two meshes due to the 45° pressure angle, three waves away, or 10.8° from the center of the mesh. Given the same size eccentric (0.1"), the sliding velocity is:

$$v_f=1.414 \times 0.1 \times 6.28 \times 100 \times \sin 10.8° = 11.55 \text{ in/sec.}$$

for a 10" diameter gear. This leads to the loss of:

$$\frac{0.02 \times 11.55 \times 10180}{12 \times 550} = 0.713 \text{ hp} \quad \text{(EQUATION 2)}$$

which is a percentage loss of 6.24%. That is 4× the loss in the MPE which uses circular arc gear teeth. The trade literature for the Nabtesco and Spinea suggest losses of 20% under these conditions. Obviously, careful FEA force/velocity analysis and prototype experimentation will help to clarify these results. The ratio of 5× less loss for the circular arc teeth appears to be defensible under this preliminary assessment.

A comparison of the performance characteristics of the MPE and Twin Spin gear trains is provided in TABLE 5 below.

TABLE 5

MPE/Twin Spin Performance Comparison

| | Twin Spin | MPE |
|---|---|---|
| Torque Density | 33 ft-lbf/lbf | 60 ft-lbf/lbf (possibly 3x) |
| Stiffness | 921 ft-lb/arc min | 8000 ft-lb/arc min (~9x) |
| Lost Motion | 1 arc min | 0.25 arc min (if preloaded) |
| Pressure Angle | 45° | 7° |
| Efficiency | High Losses | Low Losses (5x) |
| Complexity | Medium | Medium (+) |
| Roller Splines | Yes | Yes |
| Splash Lube | Yes | Yes |
| Crankshaft | Yes | No |
| Bearing Deformation | | |
| Naturally Balanced | Yes | Yes |
| No Ripple Error | Yes | Yes |
| Shortest Force Path | Yes/No | Yes |
| Front End Reducer Possible | Yes | Yes |
| Design Priorities | Compactness | Roller Splines |

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A rotary actuator, comprising:
    an internal gear;
    first and second parallel eccentric gears which mesh with said internal gear;
    a crankshaft equipped with first and second eccentrics which are 180° out-of-phase and which drive said first and second parallel eccentric gears, respectively;
    a prime mover which drives said crankshaft;
    first and second crosslinks which prevent the rotation of said first and second parallel eccentric gears, respectively; and
    first and second sets of splines which engage said first and second parallel eccentric gears, respectively;
    wherein said first and second parallel eccentric gears have circular arc gear teeth.

2. The rotary actuator of claim 1, further comprising an internal ring gear, wherein said first parallel eccentric gear is equipped with a first mesh, wherein said second parallel eccentric gear is equipped with a second mesh, and wherein said first and second parallel eccentric gears mesh with said internal ring gear such that said first and second meshes are 180° out-of-phase.

3. The rotary actuator of claim 1, wherein each of said first and second splines has a longitudinal axis, and wherein all of the moving masses in said rotary actuator move in a direction parallel to the longitudinal axis of the first or second spline.

4. The rotary actuator of claim 1, further comprising set of roller bearings that constrain the motion of the output ring gear relative to the stationary gear cage.

5. The rotary actuator of claim 1, wherein said first and second parallel eccentric gears are oscillating gears.

6. The rotary actuator of claim 5, wherein said first and second parallel eccentric gears are supported by a plurality of roller element bearings.

7. The rotary actuator of claim 1, wherein said circular arc gear teeth move in a hypocyclic motion when the rotary actuator is activated.

8. The rotary actuator of claim 1, wherein said circular arc gear teeth have a pressure angle in the range of 6° to 8°.

9. The rotary actuator of claim 1, wherein said circular arc gear teeth have a pressure angle of about 7°.

10. The rotary actuator of claim 1, wherein said internal gear is a single output internal gear.

11. The rotary actuator of claim 1, wherein said crankshaft is a central crankshaft.

12. The rotary actuator of claim 1, wherein said first and second eccentrics drive said first and second parallel eccentric gears without rotation.

13. The rotary actuator of claim 12, wherein rotation of the first and second parallel eccentric gears is prevented by first and second crosslinks.

14. The rotary actuator of claim 1, wherein said first and second parallel eccentric gears are external gears.

15. The rotary actuator of claim 1, wherein said first crosslink has a first set of surface features on a surface thereof which engage a second set of surface features on said first eccentric gear.

16. The rotary actuator of claim 15, wherein each member of said first and second sets of surface features is a protrusion or a depression.

17. The rotary actuator of claim 15, wherein each member of said first set of surface features is a tongue, and wherein each member of said second set of surface features is a groove.

18. The rotary actuator of claim 17, wherein, and wherein said first and second sets of features form a tongue and groove spline.

19. The rotary actuator of claim 1, wherein said first eccentric gear is disposed on a first end of said crankshaft, and wherein said second eccentric gear is disposed on a second end of said crankshaft.

20. The rotary actuator of claim 1, wherein said actuator has a torque density within the range of about 40 ft-lbf/lbf to about 80 ft-lbf/lbf.

* * * * *